(12) United States Patent
Tateishi et al.

(10) Patent No.: US 7,512,049 B2
(45) Date of Patent: *Mar. 31, 2009

(54) OPTICAL PICKUP APPARATUS INCLUDING EMISSION DEVICE, LIGHT BEAM EMISSION CONTROL METHOD, AND COMPUTER-READABLE RECORDED MEDIUM IN WHICH LIGHT BEAM EMISSION CONTROL PROGRAM IS RECORDED

(75) Inventors: Kiyoshi Tateishi, Tsurugashima (JP); Junichi Furukawa, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 628 days.

This patent is subject to a terminal disclaimer.

(21) Appl. No.: 10/753,450

(22) Filed: Jan. 9, 2004

(65) Prior Publication Data
US 2004/0145991 A1 Jul. 29, 2004

(30) Foreign Application Priority Data
Jan. 10, 2003 (JP) .......................... P2003-004828

(51) Int. Cl.
*G11B 7/00* (2006.01)
(52) U.S. Cl. .................. 369/59.11; 369/116; 369/47.52
(58) Field of Classification Search ............... 369/53.26, 369/59.11, 47.53, 59.12, 116, 47.5, 47.51, 369/47.52; G11B 7/125
See application file for complete search history.

(56) References Cited

U.S. PATENT DOCUMENTS

| | | | |
|---|---|---|---|
| 5,126,994 A | 6/1992 | Ogawa et al. | |
| 5,144,601 A * | 9/1992 | Maeda et al. | 369/13.25 |
| 5,956,313 A | 9/1999 | Maegawa et al. | |
| 6,147,957 A | 11/2000 | Nagara et al. | |
| 6,400,673 B1 * | 6/2002 | Shigemori | 369/116 |
| 6,600,712 B1 * | 7/2003 | Masui et al. | 369/116 |
| 6,664,526 B2 * | 12/2003 | Yokoi | 250/201.5 |
| 6,801,240 B2 * | 10/2004 | Abe et al. | 347/252 |
| 7,006,423 B2 * | 2/2006 | Yamanoi et al. | 369/59.25 |
| 7,109,462 B2 * | 9/2006 | Tateishi et al. | 250/205 |
| 2002/0018419 A1 | 2/2002 | Watabe | |
| 2002/0159364 A1 | 10/2002 | Miyagawa et al. | |
| 2004/0079864 A1 | 4/2004 | Suzuki | |

FOREIGN PATENT DOCUMENTS

| | | |
|---|---|---|
| EP | 1 207 525 | 5/2002 |
| EP | 1 213 713 | 6/2002 |
| EP | 1 258 956 | 11/2002 |
| EP | 1 437 718 | 7/2004 |
| JP | 11-339398 | 12/1999 |
| JP | 2002-163824 | 6/2002 |
| JP | 2002-170236 | 6/2002 |
| WO | WO 02/097804 | 12/2002 |
| WO | WO 03/001519 | 1/2003 |

* cited by examiner

*Primary Examiner*—Thang V Tran
(74) *Attorney, Agent, or Firm*—Drinker Biddle & Reath LLP

(57) ABSTRACT

An optical pickup apparatus comprises a semiconductor laser output controller for emitting laser beam, a photodetector for detecting the emitted laser beam, a sampling processor for performing a sampling process, a pulse current generator for generating erase current pulses, write current pulses, and read current pulses, and a controller for controlling the above components. The apparatus performs the sampling process and generates the current pulses according to a predetermined APC timing and controls the semiconductor laser output controller based on the sampling process and current pulses.

9 Claims, 17 Drawing Sheets

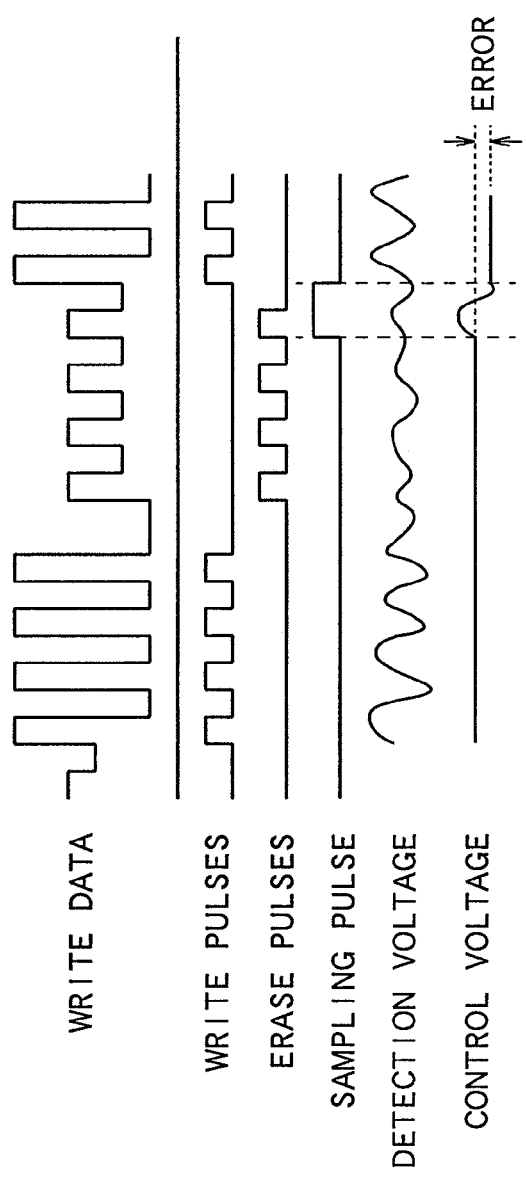
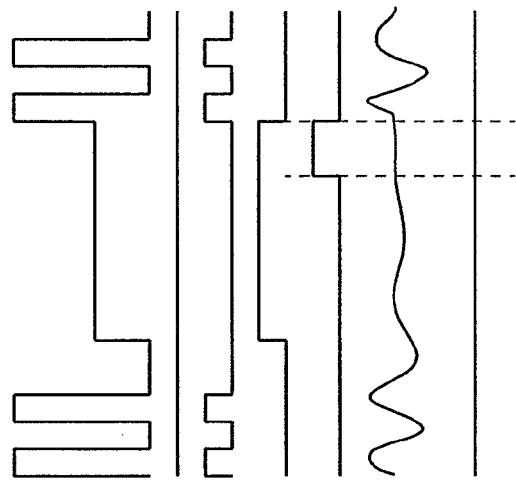

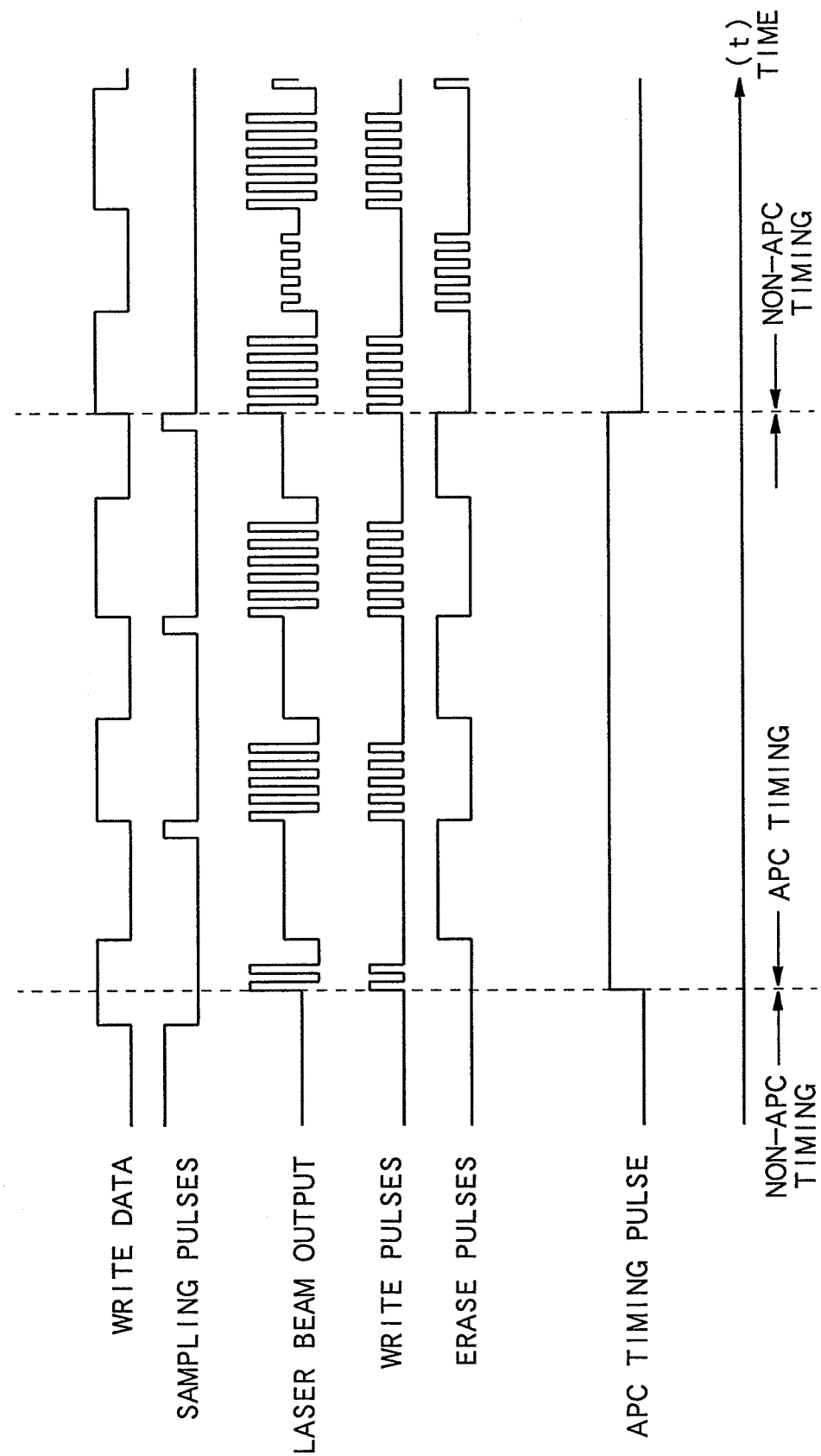

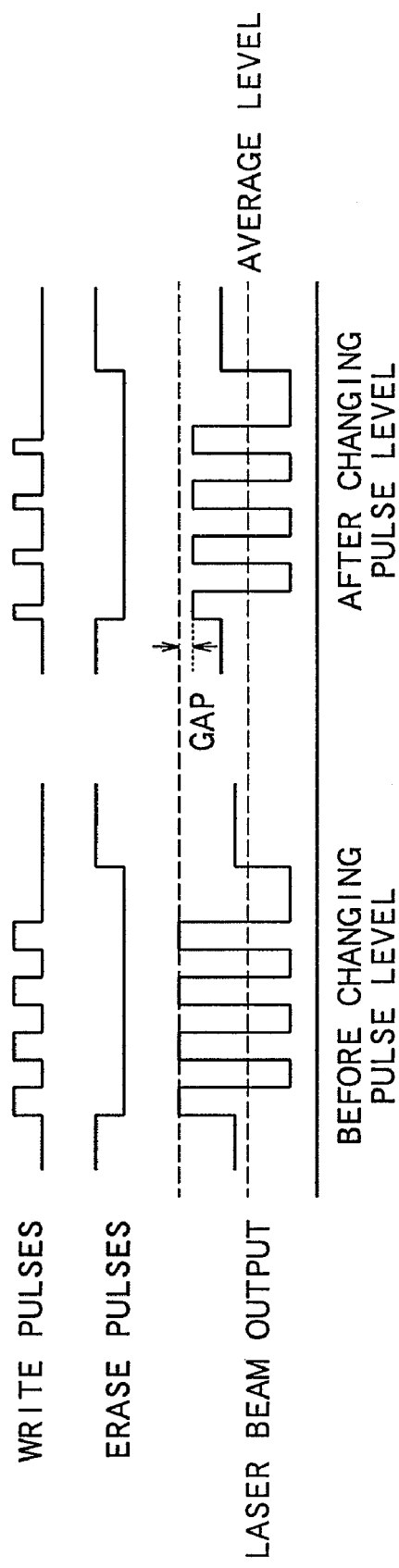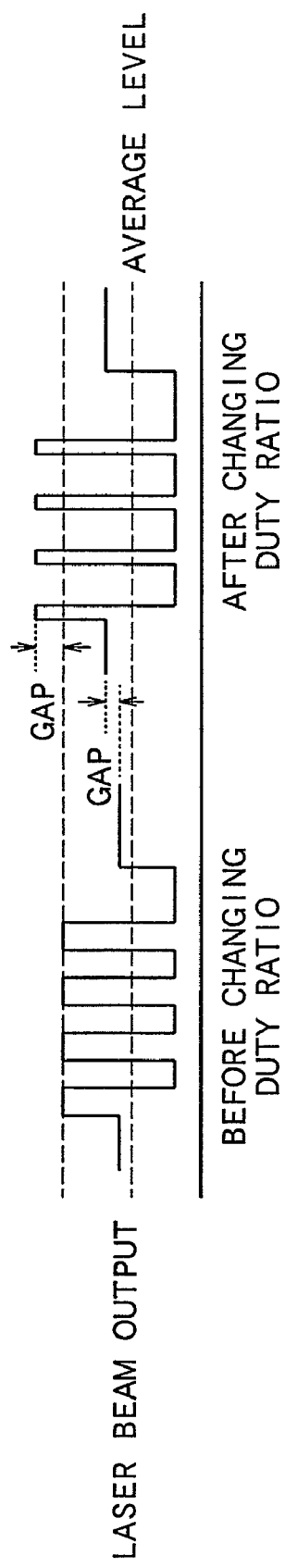

OPTICAL PICKUP APPARATUS INCLUDING EMISSION DEVICE, LIGHT BEAM EMISSION CONTROL METHOD, AND COMPUTER-READABLE RECORDED MEDIUM IN WHICH LIGHT BEAM EMISSION CONTROL PROGRAM IS RECORDED

BACKGROUND OF THE INVENTION

1. Field of the Invention

This invention relates to the technical field of an optical pickup apparatus used for recording data on optical recording media such as optical discs and for reproduction of the data recorded on the optical recording media.

2. Description of the Related Art

In recent years, as CDs (Compact Discs) and DVDs (Digital versatile Discs) have spread widely, and a recording and reproducing device used to reproduce information recorded on those optical recording medium have been developed. Then, there is a demand for technology for recording data stably on the optical recording medium and technology for reproducing data recorded on the recording medium stably.

In particular, semiconductor leaser used to record and reproduce data on optical on optical disc drive is also used as light source in other technical field such as technical field of optical communications systems and image forming apparatus. In using semiconductor laser, these apparatus are generally equipped with a laser output control unit to control laser output appropriately.

One of typical control methods for the laser output control unit is an average APC (Automatic Power Control) method that performs negative feedback control of laser output based on as average value of the laser output.

For example, according to average APC method, in a case of controlling the output of laser beam to record data on a DVD disc and reproduce data recorded on the DVD disc, the laser beam emitted from a semiconductor laser based on write data to be written on the DVD disc is detected by a monitoring photodetector. Then, average value of light beam intensities is calculated over a certain period of time based on the light beam intensity of the detected laser beam, and negative feedback control is performed with respect to output level of the laser beam emitted to the DVD disc based on the calculated average value of light beam intensities and a preset target light beam intensity of laser beam (see for example, Japanese Laid-Open Patent Application No. H11-339398).

However, in the case of performing negative feedback control as the described above, the conventional average APC method is not capable of independently setting intensity levels and irradiation times of different laser beam. In other words, the conventional average APC method is not capable of maintaining independence of individual intensity levels.

SUMMARY OF THE INVENTION

Taking the aforementioned point into consideration, the object of this invention is to provide an optical pickup apparatus are capable of changing intensity levels and irradiation times of the beam outputted from a semiconductor easily and independently when the intensity levels of the laser beam outputted from the semiconductor laser are modulated.

The above object of present invention can be achieved by a light beam output control apparatus of the present invention. The light beam output control apparatus, which modulates intensity of a light beam based on data to be recorded on an optical recording medium and emits the light beam, of which intensity is modified, to the optical recording medium, is provided with: an emission device which emits the light beam to the optical recording medium by switching between a multi-pulse beam consisting of a plurality of pulsed lights and single-pulse beam consisting of a single pulsed light depending on the data, the emission device being for emitting the single-pulse beam when recording the data on the optical recording medium during a predetermined period; a detection device which detects at least part of the light beam emitted from the emission device; an acquisition device which acquires an emitted light intensity level of the detected light beam as a sampling value during a predetermined period; a storage device which stores, as a target sampling value, a sampling value that serves as a target for the light intensity level of the light beam acquired as the sampling value; an error calculation device which calculates error between the stored target sampling value and the acquired sampling value; and a control device which controls the output intensity level of the light beam emitted from the emission device, based on the calculated sampling error.

According to the present invention, the light beam to the optical recording medium is emitted by the single-pulse beam when the sampling value is acquired.

Accordingly, in the present invention, when recording the write data on an optical disc by modulating the intensity level of the laser beam outputted from a semiconductor laser, it is possible to use the multi-pulse laser beam and to acquire the sample values using the laser beam with a stable waveform. Therefore, it is possible to control the semiconductor laser which emits the laser beam, based on the sample values which allow the light intensity level of the laser beam to be grasped exactly.

Furthermore, even if the light intensity level and the duty ratio of only write pulses or erase pulses are changed, the intensity levels of other pulses are not affected. Therefore, intensity levels to be modulated or irradiation times can be changed easily and independently.

In one aspect of the present invention, the light beam output control apparatus is further provided with: a period setting device which sets the predetermined period for the acquisition device to acquire the emitted light intensity level of the detected light beam as a sampling value.

According to the present invention, the predetermined period for the acquisition device to acquire the emitted light intensity level of the detected light beam as the sampling value is set.

Accordingly, in the present invention, even if the sampling process is performed during an APC timing period based on address information or on its own, the accuracy of negative feedback control can be improved if the APC timing is set in such a way as to increase the frequency of the sampling process.

The above object of present invention can be achieved by a optical pickup apparatus of the present invention. The optical pickup apparatus, which records data on an optical recording medium with multiple kinds of different partial data by modulating a intensity of light beam based on each kind of partial data and emitting the light beam, of which intensity is modified, to the optical recording medium, is provided with: an emission device which emits the light beam to the optical recording medium by switching between a multi-pulse beam for recording one item of the partial data using a plurality of pulsed lights and a single-pulse beam for recording one item of the partial data using one pulsed light, the emission device being for emitting the single-pulse beam when recording a predetermined kind of partial data on the optical recording medium; a detection device which detects at least part of the light beam emitted from the emission device; an acquisition device which acquires an emitted light intensity level of the detected light beam as a sampling value when recording a predetermined kind of the partial data; a storage device which stores, as a target sampling value, a sampling value that serves as a target for the light intensity level of the light beam acquired as the sampling value; an error calculation device which calculates error between the stored target sampling value and the acquired sampling value; and a control device which controls the output intensity level of the light beam emitted from the emission device, based on the calculated sampling error.

According to the present invention, the light beam to the optical recording medium is emitted by the single-pulse beam when the sampling value is acquired.

Accordingly, in the present invention, when recording the write data on an optical disc by modulating the intensity level of the laser beam outputted from a semiconductor laser, it is possible to use the multi-pulse laser beam and to acquire the sample values using the laser beam with a stable waveform. Therefore, it is possible to control the semiconductor laser which emits the laser beam, based on the sample values which allow the light intensity level of the laser beam to be grasped exactly.

Furthermore, even if the light intensity level and the duty ratio of only write pulses or erase pulses are changed, the intensity levels of other pulses are not affected. Therefore, intensity levels to be modulated or irradiation times can be changed easily and independently.

In one aspect of the present invention, when recording a predetermined kind of the partial data during a predetermined period, the optical pickup apparatus is further provided with: the emission device emits a single-pulse beam; and the acquisition device acquires, as a sampling value, the emitted light intensity level of the light beam detected by the detection device.

According to the present invention, in the case where the single-pulse beam is emitted when recording a predetermined kind of the partial data during a predetermined period, the sampling value is acquired.

Normally, each kind of the partial data is appeared randomly on the composition of data to be recorded on the optical disc. On the other hand, kind of the partial data is appeared with a fixed interval.

Accordingly, in the present invention, it is possible to use the multi-pulse laser beam and to acquire the sample values properly using the laser beam with a stable waveform.

Furthermore, the site irradiated with the laser beam each time data is recorded is changed randomly according to the partial data appeared randomly. Therefore, it is possible to improve the durability of a recording film on the optical disc.

In one aspect of the present invention, when recording a predetermined kind of the partial data with a predetermined timing during the predetermined period, the optical pickup apparatus is further provided with: the emission device emits a single-pulse beam; and the acquisition device acquires, as a sampling value, the emitted light intensity level of the light beam detected by the detection device.

According to the present invention, in the case where the single-pulse beam is emitted when recording a predetermined kind of the partial data with a predetermined timing during the predetermined period, the sampling value is acquired.

Normally, each kind of the partial data is appeared randomly on the composition of data to be recorded on the optical disc. On the other hand, kind of the partial data is appeared with a fixed interval.

Accordingly, in the present invention, it is possible to use the multi-pulse laser beam and to acquire the sample values properly using the laser beam with a stable waveform.

Furthermore, the site irradiated with the laser beam each time data is recorded is changed randomly according to the partial data appeared randomly. Therefore, it is possible to improve the durability of a recording film on the optical disc.

In one aspect of the present invention, when recording a plurality of predeterminedkinds of the partial data, the optical pickup apparatus is further provided with: the emission device emits a single-pulse beam; and the acquisition device acquires, as a sampling value, the emitted light intensity level of the light beam detected by the detection device.

According to the present invention, in the case where the single-pulse beam is emitted when recording a predetermined kind of the partial data during the predetermined period, the sampling value is acquired.

Normally, each kind of the partial data is appeared randomly on the composition of data to be recorded on the optical disc. On the other hand, kind of the partial data is appeared with a fixed interval.

Accordingly, in the present invention, it is possible to use the multi-pulse laser beam and to acquire the sample values properly using the laser beam with a stable waveform.

Furthermore, the site irradiated with the laser beam each time data is recorded is changed randomly according to the partial data appeared randomly. Therefore, it is possible to improve the durability of a recording film on the optical disc.

In one aspect of the present invention, the optical pickup apparatus is further provided with: the emission device emits a single-pulse beam only when the acquisition device acquires the sampling value.

According to the present invention, a single-pulse beam is emitted only when the acquisition device acquires the sampling value.

Normally, each kind of the partial data is appeared randomly on the composition of data to be recorded on the optical disc. On the other hand, kind of the partial data is appeared with a fixed interval.

Accordingly, in the present invention, it is possible to use the multi-pulse laser beam and to acquire the sample values properly using the laser beam with a stable waveform.

Furthermore, the site irradiated with the laser beam each time data is recorded is changed randomly according to the partial data appeared randomly. Therefore, it is possible to improve the durability of a recording film on the optical disc.

In one aspect of the present invention, when the multiple kinds of partial data are identified by the data length of the partial data and when the partial data recorded has a predetermined data length, the optical pickup apparatus is further provided with: the emission device emits a single-pulse beam; and the acquisition device acquires, as a sampling value, the emitted light intensity level of the light beam detected by the detection device.

According to the present invention, in the case where the single-pulse beam is emitted when the multiple kinds of partial data are identified by the data length of the partial data and when the partial data recorded has a predetermined data length.

Normally, each kind of the partial data is appeared randomly on the composition of data to be recorded on the optical disc. On the other hand, kind of the partial data is appeared with a fixed interval.

Accordingly, in the present invention, it is possible to use the multi-pulse laser beam and to acquire the sample values properly using the laser beam with a stable waveform.

Furthermore, the site irradiated with the laser beam each time data is recorded is changed randomly according to the partial data appeared randomly. Therefore, it is possible to improve the durability of a recording film on the optical disc.

In one aspect of the present invention, when the data is recorded by forming marks and spaces formed on the optical recording medium, a plurality of kinds of partial data are identified by run length recorded in the marks and the spaces, and the partial data recorded has a predetermined run length, the optical pickup apparatus is further provided with: the emission device emits a single-pulse beam; and the acquisition device acquires, as a sampling value, the emitted light intensity level of the light beam detected by the detection device.

According to the present invention, in the case where the single-pulse beam is emitted when the data is recorded by means of marks and spaces formed on the optical recording medium, a plurality of kinds of partial data are identified by run length recorded in the marks and the spaces, and the partial data recorded has a predetermined run length.

Normally, each kind of the partial data is appeared randomly on the composition of data to be recorded on the optical disc. On the other hand, kind of the partial data is appeared with a fixed interval.

Accordingly, in the present invention, it is possible to use the multi-pulse laser beam and to acquire the sample values properly using the laser beam with a stable waveform.

Furthermore, the site irradiated with the laser beam each time data is recorded is changed randomly according to the partial data appeared randomly. Therefore, it is possible to improve the durability of a recording film on the optical disc.

The above object of present invention can be achieved by a light beam emission control method of the present invention. The light beam emission control method, which modulates intensity of a light beam based on data to be recorded on an optical recording medium and emits the light beam, of which intensity is modified, to the optical recording medium, is provided with: an emission process of emitting the light beam to the optical recording medium from an emission device by switching between a multi-pulse beam consisting of a plurality of pulsed lights and single-pulse beam consisting of a single pulsed light depending on the data, an emission process of emitting the light beam from an emission device to the optical recording medium by switching between a multi-pulse beam consisting of a plurality of pulsed lights and single-pulse beam consisting of a single pulsed light depending on the data, and the emission process emitting the single-pulse beam from the emission device when recording the data on the optical recording medium during a predetermined period; a detection process of detecting at least part of the light beam emitted from the emission device; an acquisition process of acquiring an emitted light intensity level of the detected light beam as a sampling value during a predetermined period; an error calculation process of calculating error between a target sampling value that serves as a target for the light intensity level of the light beam acquired as the sampling value, the target sampling value is prestored in storage device; and an emission control process of controlling the emission of the light beam from the emission device, based on the calculated sampling error in the error calculation process.

According to the present invention, the light beam to the optical recording medium is emitted by the single-pulse beam when the sampling value is acquired.

Accordingly, in the present invention, when recording the write data on an optical disc by modulating the intensity level of the laser beam outputted from a semiconductor laser, it is possible to use the multi-pulse laser beam and to acquire the sample values using the laser beam with a stable waveform. Therefore, it is possible to control the semiconductor laser which emits the laser beam, based on the sample values which allow the light intensity level of the laser beam to be grasped exactly.

Furthermore, even if the light intensity level and the duty ratio of only write pulses or erase pulses are changed, the intensity levels of other pulses are not affected. Therefore, intensity levels to be modulated or irradiation times can be changed easily and independently.

The above object of present invention can be achieved by a light beam emission control method of the present invention. The light beam emission control method, which records data on an optical recording medium with multiple kinds of different partial data by modulating a intensity of light beam based on each kind of partial data and emitting the light beam, of which intensity is modified, to the optical recording medium, is provided with: an emission process of emitting the light beam from the emission device to the optical recording medium by switching between a multi-pulse beam for recording one item of the partial data using a plurality of pulsed lights and a single-pulse beam for recording one item of the partial data using one pulsed light, the emission process emitting the single-pulse beam from the emission device when recording a predetermined kind of partial data on the optical recording medium; a detection process of detecting at least part of the light beam emitted from the emission device; an acquisition process of acquiring an emitted light intensity level of the detected light beam as a sampling value when recording a predetermined kind of the partial data; an error calculation process of calculating error between a target sampling value that serves as a target for the light intensity level of the light beam acquired as the sampling value, the target sampling value is prestored in storage device; and an emission control process of controlling the emission of the light beam from the emission device, based on the calculated sampling error in the error calculation process.

According to the present invention, the light beam to the optical recording medium is emitted by the single-pulse beam when the sampling value is acquired.

Accordingly, in the present invention, when recording the write data on an optical disc by modulating the intensity level of the laser beam outputted from a semiconductor laser, it is possible to use the multi-pulse laser beam and to acquire the sample values using the laser beam with a stable waveform. Therefore, it is possible to control the semiconductor laser which emits the laser beam, based on the sample values which allow the light intensity level of the laser beam to be grasped exactly.

Furthermore, even if the light intensity level and the duty ratio of only write pulses or erase pulses are changed, the intensity levels of other pulses are not affected. Therefore, intensity levels to be modulated or irradiation times can be changed easily and independently.

The above object of present invention can be achieved by a recorded medium of the present inversion wherein a light beam emission control program is recorded so as to be read by a computer, the computer included in a light beam output control apparatus, which modulates intensity of a light beam based on data to be recorded on an optical recording medium and emits the light beam, of which intensity is modified, to the optical recording medium, the light beam emission control program causing the computer to function as: a emission control device which controls the emission of the light beam from the emission device to the optical recording medium by switching between a multi-pulse beam consisting of a plurality of pulsed lights- and single-pulse beam consisting of a single pulsed light depending on the data, and the emission control device controlling the emission of the single-pulse beam from the emission device when recording the data on the optical recording medium during a predetermined period; a detection device which detects at least part of the light beam emitted from the emission device; an acquisition device which acquires an emitted light intensity level of the detected light beam as a sampling value during a predetermined period; an error calculation device which calculates error between a target sampling value that serves as a target for the light intensity level of the light beam acquired as the sampling value, and the target sampling value prestored in storage device; and a level control device which controls the output intensity level of the light beam emitted from the emission device, based on the calculated sampling error.

According to the present invention, the light beam to the optical recording medium is emitted by the single-pulse beam when the sampling value is acquired.

Accordingly, in the present invention, when recording the write data on an optical disc by modulating the intensity level of the laser beam outputted from a semiconductor laser, it is possible to use the multi-pulse laser beam and to acquire the sample values using the laser beam with a stable waveform. Therefore, it is possible to control the semiconductor laser which emits the laser beam, based on the sample values which allow the light intensity level of the laser beam to be grasped exactly.

Furthermore, even if the light intensity level and the duty ratio of only write pulses or erase pulses are changed, the intensity levels of other pulses are not affected. Therefore, intensity levels to be modulated or irradiation times can be changed easily and independently.

The above object of present invention can be achieved by a recorded medium of the present inversion wherein a light beam emission control program is recorded so as to be read by a computer, the computer included in a light beam output control apparatus, which records data on an optical recording medium with multiple kinds of different partial data by modulating a intensity of light beam based on each kind of partial data and emitting the light beam, of which intensity is modified, from an emission device to the optical recording medium, the light beam emission control program causing the computer to function as: an emission control device which controls the emission of the light beam from the emission device to the optical recording medium by switching between a multi-pulse beam for recording one item of the partial data using a plurality of pulsed lights and a single-pulse beam for recording one item of the partial data using one pulsed light, the level control device controlling the emission of the single-pulse beam when recording a predetermined kind of partial data on the optical recording medium; a detection device which detects at least part of the light beam emitted from the emission device; an acquisition device which acquires an emitted light intensity level of the detected light beam as a sampling value when recording a predetermined kind of the partial data; an error calculation device which calculates error between a target sampling value that serves as a target for the light intensity level of the light beam acquired as the sampling value, the target sampling value is prestored in storage device, and a level control device which controls the output intensity level of the light beam emitted from the emission device, based on the calculated sampling error.

According to the present invention, the light beam to the optical recording medium is emitted by the single-pulse beam when the sampling value is acquired.

Accordingly, in the present invention, when recording the write data on an optical disc by modulating the intensity level of the laser beam outputted from a semiconductor laser, it is possible to use the multi-pulse laser beam and to acquire the sample values using the laser beam with a stable waveform. Therefore, it is possible to control the semiconductor laser which emits the laser beam, based on the sample values which allow the light intensity level of the laser beam to be grasped exactly.

Furthermore, even if the light intensity level and the duty ratio of only write pulses or erase pulses are changed, the intensity levels of other pulses are not affected. Therefore, intensity levels to be modulated or irradiation times can be changed easily and independently.

BRIEF DESCRIPTION OF THE DRAWINGS

FIG. 4A is a first diagram illustrating a sampling process;

FIG. 4B is a second diagram illustrating a sampling process;

FIG. 5 is a timing chart illustrating a negative feedback control operation according to the first embodiment;

FIG. 8A is a first diagram illustrating effect of the first embodiment;

FIG. 8B is a second diagram illustrating effect of the first embodiment;

DETAILED DESCRIPTION OF THE PREFERRED EMBODIMENTS

Preferred embodiments of the present invention will be described with reference to the drawings.

The embodiments will be described below, citing a case in which an optical pickup apparatus according to the present invention are applied to an optical pickup apparatus which records data on an optical recording medium and reproduces data from an optical recording medium by using a laser beam (light beam). As the optical recording medium, a writable optical disc (hereinafter referred to simply as an optical disc) will be used.

First Embodiment

To begin with, a first embodiment of the optical pickup apparatus will be described with reference to FIGS. 1 to 8.

First, configuration of the optical pickup apparatus according to this embodiment will be described with reference to FIG. 1.

Figure 1:
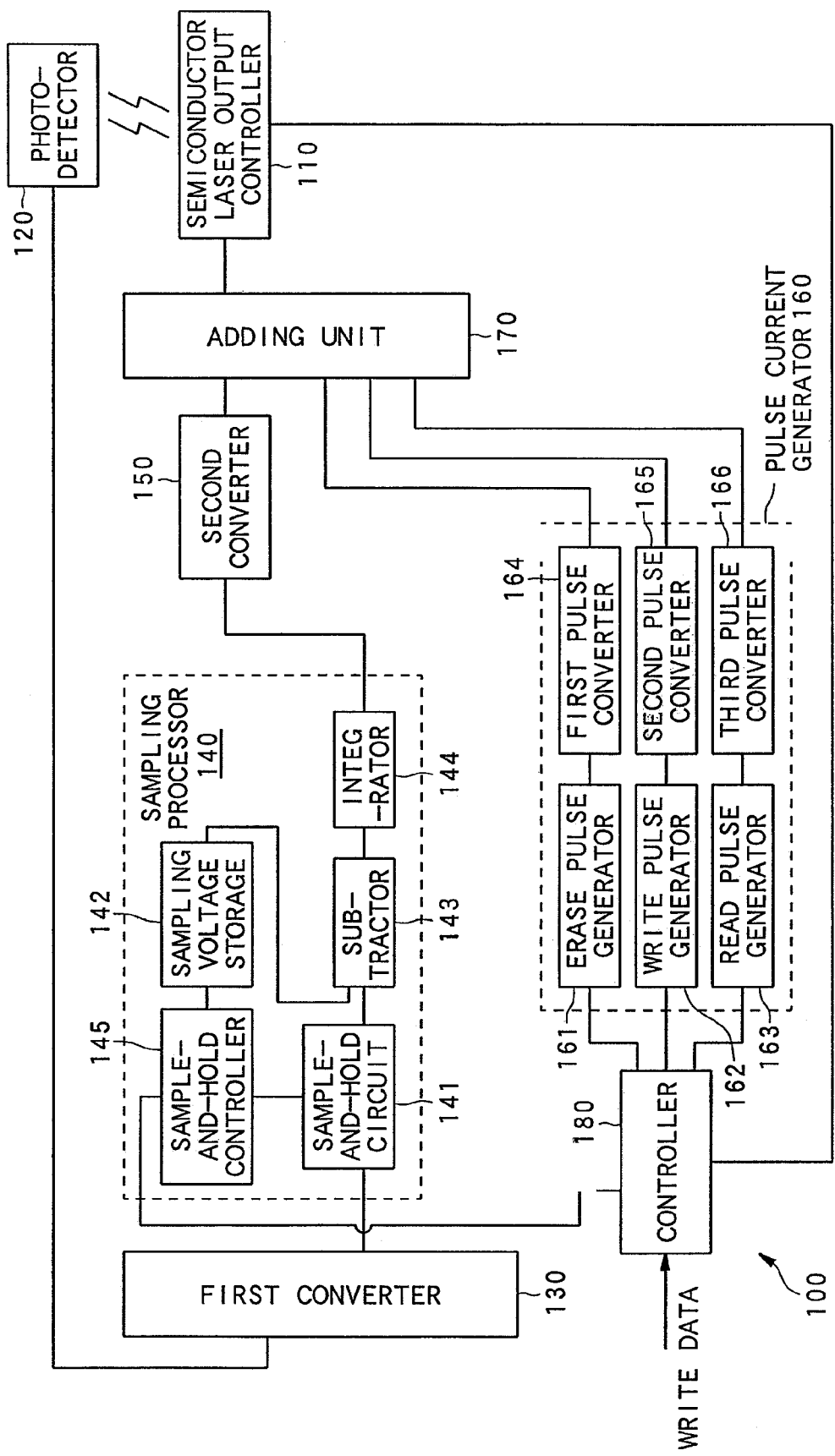
FIG. 1 is a block diagram showing the construction of an optical pickup apparatus according to a first embodiment.

FIG. 1 is a block diagram showing construction of the optical pickup apparatus according to this embodiment.

An optical pickup apparatus 100 shown in FIG. 1 comprises: a semiconductor laser output controller 110 for emitting laser beam for recording and reproducing data to an optical disc; a photodetector 120 for detecting part of the emitted laser beam and outputs currents based on the detected laser beam (hereinafter referred to as the detection currents); a first converter 130 for converting the detection currents into voltages (hereinafter referred to as the detection voltages); a sampling processor 140 for performing a sampling process on the detection voltages; a second converter 150 for converting the sampled voltages into current, a pulse current generator 160 for generating erase current pulses; write current pulses; an adding unit 170 for adding the generated current pulses and the current resulting from the conversion carried out by the second converter 150, and a controller 180 for controlling the above components.

Incidentally, for example, the semiconductor laser output controller 110 serves as the emission device, the emission control device and the control device according to the present invention, and the photodetector 120 serves as the detection device according to the present invention.

Also, for example, the sampling processor 140 serves as the acquisition device, the error calculation device, the information acquisition device, and the setting device according to the present invention; and the controller 180 serves as the period setting device and the level control device according to the present invention.

The semiconductor laser output controller 110 has a semiconductor laser circuit for emitting the laser beam, controls the intensity level and pulse form of output the laser beam based on control current outputted by the second converter 150, and emits the controlled the laser beam to an optical disc.

The semiconductor laser output controller 110 emits the laser beam in such a way as to form marks on a phase-change film, which is a recording film provided on the optical disc, and form spaces on the phase-change film by erasing marks already formed on it. Also, the semiconductor laser output controller 110 emits the laser beam in such a way as to read data represented by the marks or spaces already formed on the phase-change film.

Incidentally, amplitude pits formed on the phase-change film are referred to as marks, and data intervals for forming the amplitude pits on the optical disc or data intervals of amplitude pits formed on the optical disc are referred to as mark intervals. Blanks formed when the marks already formed on the phase-change film are erased are referred to as spaces, and data intervals for forming the spaces on the optical disc or data intervals formed on the optical disc are referred to as erase intervals.

Specifically, when writing write data on the optical disc, the semiconductor laser output controller 110 emits the laser beam to the optical disc by switching among the intensity level for forming marks on the optical disc (hereinafter referred to as the write level), intensity level for forming spaces on the optical disc (hereinafter referred to as the erase level), and intensity level for reading data from the optical disc (hereinafter referred to as the read level) based on the control current outputted from the adding unit 170.

More specifically, when writing write data on the optical disc, the semiconductor laser output controller 110 emits the laser beam to the optical disc by switching between pulses generated at the write level (hereinafter referred to as the write pulses) and pulses generated at the erase level (hereinafter referred to as the erase pulses) based on the control current outputted from the adding unit 170.

The write pulses consist of a plurality of pulses (hereinafter referred to as multi-pulses) which alternate between the write level and an intensity level which is extremely low compared with the write level (hereinafter referred to as the write reference level).

On the other hand, the erase pulses consist of a plurality of pulses which alternate between the erase level and a intensity level which is extremely low compared with the erase level (hereinafter referred to as the erase reference level) or consist of pulses of a single intensity level (hereinafter referred to as single-pulses).

Now, description will be given of the pulse form of the laser beam outputted from the semiconductor laser output controller 110, with reference to FIG. 2.

FIG. 2 is a diagram showing relationship between multi-pulses and single-pulses in terms of heat buildup.

Figure 2A:
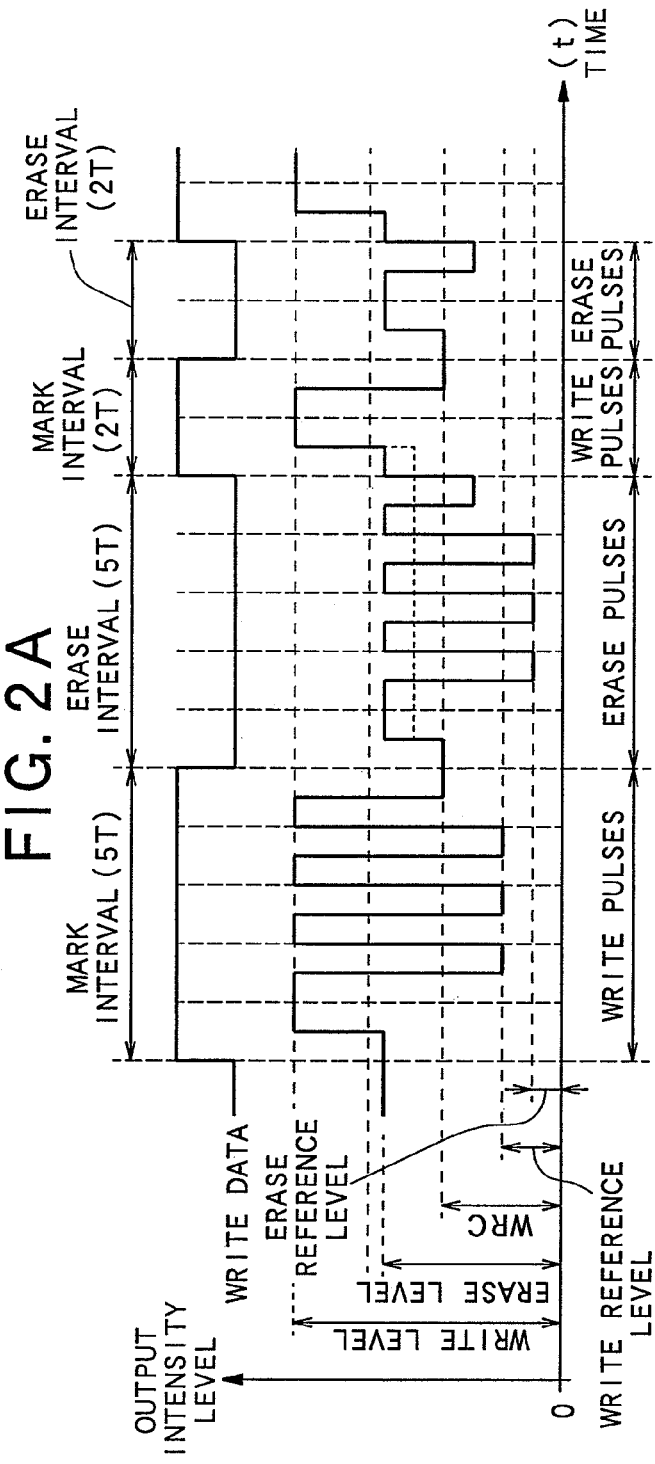
FIG. 2A is a first diagram showing relationship between multi-pulses and single-pulses in terms of heat buildup.

According to this embodiment, write pulses and erase pulses are generally emitted as multi-pulses as shown in FIG. 2A because of heat buildup on the optical disc caused by laser beam irradiation. Only in a sampling process described later, erase pulses are emitted as single-pulses.

Figure 2B:
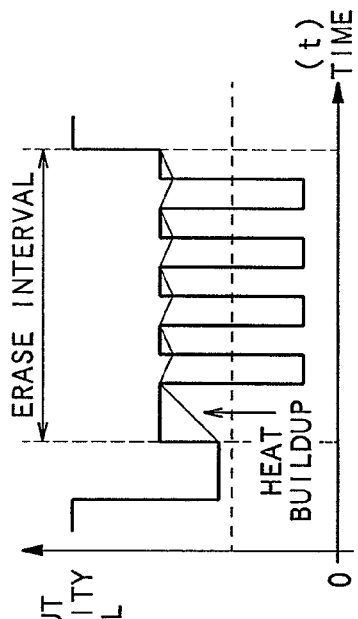
FIG. 2B is a second diagram showing relationship between multi-pulses and single-pulses in terms of heat buildup.

For example, if the erase pulses are always emitted as single-pulses, the optical disc is always irradiated with laser beam as shown in FIG. 2B. Consequently, heat builds up on the optical disc during an erase interval, increasing the temperature of the recording film on the optical disc.

Figure 2C:
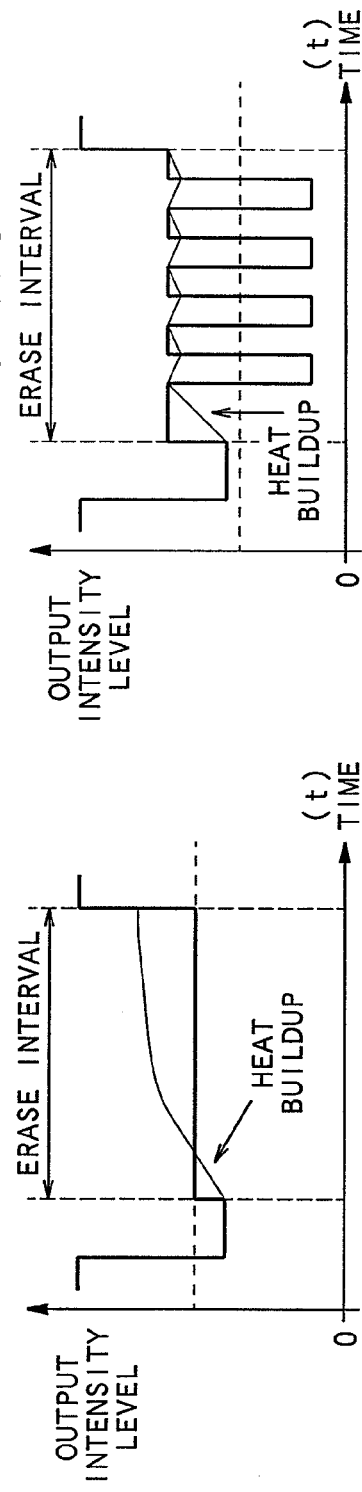
FIG. 2C is a third diagram showing relationship between multi-pulses and single-pulses in terms of heat buildup.

However, if the erase pulses are emitted as multi-pulses, rises and falls of the laser beam emission level prevent heat buildup on the optical disc during the erase interval as shown in FIG. 2C.

Thus, according to this embodiment, the semiconductor laser output controller 110 normally emits the laser beam as multi-pulses to protect the recording film on the optical disc and avoid errors during data recording.

On the other hand, as described later, if the erase pulses of laser beam are emitted as multi-pulses during a sampling process, the light intensity level becomes unstable during acquisition of sample values, making it impossible to carry out the sampling process properly.

Thus, the semiconductor laser output controller 110 according to this embodiment emits the laser beam by switching from multi-pulses to single-pulses only in the sampling process described later.

Incidentally, in FIG. 2, the letter T in the mark intervals and erase intervals indicates a period which serves as a reference for run length when reading mark and space during reproduction of data recorded on the optical disc. Also, WRC indicates a cooling level during writing. It is a level used to cool the surfaces of the optical disc quickly to arrange the ends of the marks.

Furthermore, as described later, the semiconductor laser output controller 110 modulates intensity of a generated light beam according to control current generated based on multiple kinds of partial data (i.e., modulated data described later) and emits the light beam, of which intensity is modulated, to the optical disc.

In this way, based on the control current and various pulse currents generated at the instruction of the controller 180, the semiconductor laser output controller 110 according to this embodiment switches among read pulses, write pulses, and erase pulses, controls the switching between multi-pulses and single-pulses, and controls the intensity modulation of laser beam using modulated data.

The photodetector 120 detects part of the laser beam, for example, a few percent of the laser beam outputted from the semiconductor laser output controller 110, generates detection current based on the detected laser beam, and outputs the generated detection current to the first converter 130.

The first converter 130 receives the detection current generated by the photodetector 120, converts the inputted detection current into detection voltage, and outputs the detection voltage to the sampling processor 140.

The sampling processor 140 receives the detection voltage outputted from the first converter 130. Based on instructions from the controller 180, the sampling processor 140 performs a sampling process on the inputted detection voltage, generates control voltage for use in negative feedback control of the laser beam, and outputs the control voltage to the second converter 150.

Incidentally, details of the sampling processor 140 and the sampling process according to this embodiment will be described later.

The second converter 150 receives the control voltage outputted from the sampling processor 140, converts the inputted control voltage into current, and outputs the current to the adding unit 170.

The pulse current generator 160 generates erase pulses, write pulses, and read pulses under the control of the controller 180, converts these pulses into control current, and outputs the current as control current to the semiconductor laser output controller 110 via the adding unit 170.

Specifically, the pulse current generator 160 generates read pulses of single-pulse when reading data (hereinafter referred to as read mode) and generates the erase pulses of multi-pulse and write pulses of multi-pulse when writing data (hereinafter referred to as write mode). Also, it generates erase pulses as single-pulses during APC timing periods as described later.

As shown in FIG. 1, the pulse current generator 160 comprises: an erase pulse generator 161 which generates erase voltage pulses under the control of the controller 180; write pulse generator 162 which generates write voltage pulses under the control of the controller 180; read pulse generator 163 which generates read voltage pulses under the control of the controller 180; and a first pulse converter 164 which convert the voltage pulses into current pulses, a second pulse converter 165 which convert the voltage pulses into current pulses, and a third pulse converter 166 which convert the voltage pulses into current pulses. The pulse current generator 160 generates the pulses on instructions from the controller 180.

The pulse generators 161, 162 and 163 generate erase voltage pulses, write voltage pulses, or read voltage pulses based on instructions from the controller 180 concerning write mode or read mode and on a duty ratio preset by the controller 180, and output the generated erase voltage pulses, write voltage pulses, or read voltage pulses to the pulse converters 164, 165, and 166.

The first pulse converter 164 receives the erase voltage pulses outputted from the erase pulse generator 161, converts the inputted erase voltage pulses into erase current pulses, and outputs the erase current pulses to the adding unit 170.

The second pulse converter 165 receives the write voltage pulses outputted from the write pulse generator 162, converts the inputted write voltage pulses into write current pulses, and outputs the write current pulses to the adding unit 170.

The third pulse converter 166 receives the read voltage pulses outputted from the read pulse generator 163, converts the inputted read voltage pulses into read current pulses, and outputs the read current pulses to the adding unit 170.

The adding unit 170 receives the control current converted from the control voltage by the second converter 150 as well as the erase, write, and read current pulses outputted from the pulse current generator 160. Then, the adding unit 170 adds the inputted current pulses and control current and outputs the results to the semiconductor laser output controller 110.

The controller 180 controls the current pulse generation done by the pulse current generator 160 and controls the sampling process. Also, the controller 180 performs negative feedback control of the optical output of the laser beam via the semiconductor laser output controller 110 as described above.

Now, description will be given of the principle of the negative feedback control performed by the optical pickup apparatus 100 according to this embodiment, with reference to FIG. 3.

Figure 3:
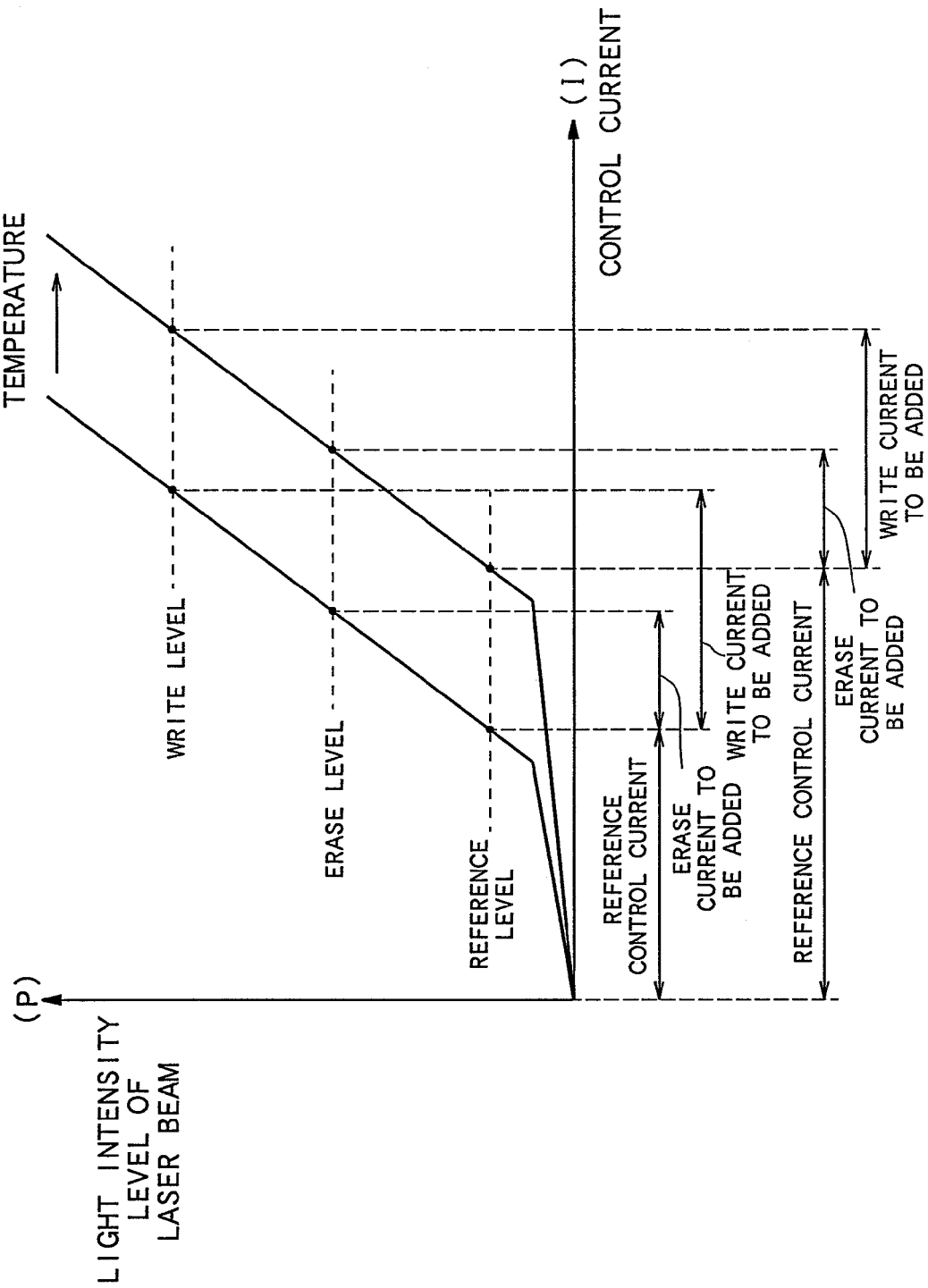
FIG. 3 is a diagram illustrating negative feedback control of an optical pickup apparatus.

FIG. 3 is a diagram illustrating the principle of negative feedback control. It is a graph showing relationship between IP characteristics and temperature of laser beam placed under negative feedback control.

Normally, when writing data on a writable optical disc, if optical power P corresponding to the erase level at which spaces are generated and write level at which marks are generated is kept constant, the current values I change along with temperature changes of the semiconductor laser over time as shown in FIG. 3.

Thus, the optical pickup apparatus 100 cannot form marks and spaces on the optical disc in a suitable manner unless it controls the current values for the intensity levels of the light to be output from the semiconductor laser.

In contrast, even if the IP (current vs. optical power) characteristics of the laser change along with the temperature changes, the amount of change in the current value at the erase level or write level from the current value at a reference light intensity level (hereinafter referred to simply as the reference level) remains unchanged.

Consequently, once the current value at the reference level is established, the controller 180 does not need to control the current value at the erase level or current value at the data write level higher than the reference level in accordance with temperature changes.

In this way, according to this embodiment, to control the reference level changed with temperature changes, i.e., the reference level of the control current used to control the light intensity level of the laser beam, the controller 180 generates a drive current for driving the semiconductor laser circuit in accordance with temperature changes over time, generates a control current with stable frequency characteristics for negative feedback control, and controls of output of the light intensity of the laser beam to read data precisely.

Specifically, according to this embodiment, when reading data from the optical disc, when recording data on the optical disc, or when erasing data already recorded on the optical disc, the controller 180 controls the light intensity level and pulse form of the laser beam emitted from the semiconductor laser output controller 110 by controlling the semiconductor laser output controller 110 and pulse current generator 160.

Incidentally, when reading data from the optical disc, laser beam of exceedingly high intensity will erase marks formed on the optical disc. Thus, when reading data from the optical disc, the controller 180 emits the laser beam at a low intensity level only sufficient to sense reflecting levels of marks and spaces.

Also, when recording data on the optical disc, the controller 180 controls the light intensity level of the laser beam, modulates intensity of the laser beam based on multiple kinds of partial data, and emits the laser beam, of which intensity is modulated, to the optical disc.

Specifically, according to this embodiment, 8-bit write data is modulated into 16-bit data for recording. Then, the controller 180 modulates intensity of the laser beam based on multiple kinds of partial data with different run lengths (hereinafter referred to as modulated data) resulting from the bit modulation and emits the laser beam of which intensity is modulated.

Incidentally, according to this embodiment, the controller 180 emits the laser beam to a phase-change film provided as a recording film on the optical disc, based on the modulated data, and thereby forms marks and spaces with different run lengths. That is, pits corresponding to data with different pulse widths and durations are formed on the optical disc based on the modulated data.

Furthermore, the controller 180 according to this embodiment controls the output intensity level of the laser beam in areas provided, to adjust the output intensity level of the laser beam (hereinafter referred to as APC (Automatic Power Control) areas), in that area of the optical disc in which content information such as video or audio is written (hereinafter referred to as the data write area).

Specifically, the controller 180 generates pulses (hereinafter referred to as APC timing pulses) internally regular cycles with timings corresponding to the APC areas (hereinafter referred to as APC timings) and controls the output intensity level of laser beam with the APC timings. Also, as described later, the controller 180 generates sampling pulses based on modulated data inputted during APC timing periods and thereby controls the sampling processor 140 and other components.

Incidentally, according to this embodiment, for example, the frequency of the APC timing pulses generated by the controller 180 on its own is set to 10 kHz and the pulse width of the APC timing pulse is set to a few μsec. Alternatively, the frequency of the APC timing pulses is set to a predetermined value based on the frequency of FG (frequency generator) pulses detected from the rotational frequency of a spindle motor (not shown) and the pulse width is set based on the APC timing pulses.

Also, according to this embodiment, the controller 180 may control the output intensity level of the laser beam in specified APC areas based on control information recorded in advance on the optical disc which records content information.

Specifically, in the above case, the controller 180 acquires pre-address information recorded beforehand in the lead-in area or the like of the optical disc into which data is written, address information represented by pre-pits according to a land pre-pit/CAPA (Complimentary Allocated Pit Addressing) method, or address information represented by wobble signals, knows the position of APC areas on the optical disc based on the acquired address information, and generates APC timing pulses in accordance with the APC areas on the optical disc.

That is, the controller 180 determines the intervals at which the APC areas are provided on the optical disc based on the positions of the APC areas on the optical disc learned from pre-address information or the like and generates timing pulses according to the determined intervals.

The controller 180 controls the output intensity level of the laser beam with the APC timings. Also, the controller 180 generates sampling pulses based on modulated data inputted during APC timing periods and thereby controls the sampling processor 140 and other components.

Furthermore, the controller 180 outputs the generated APC timing pulses and the sampling pulses to the sampling processor 140 and the pulse current generator 160.

Incidentally, the data recorded in the APC areas on the optical disc is treated during reproduction as data independent of content information to be recorded on the optical disc.

When OPC (Optimized Power Control) is performed to determine optimum conditions for a optical disc write operation by writing on a trial basis at the beginning of the write operation to each optical disc, the controller 180 according to this embodiment determines the reference level of the write or erase level and duty ratio, and target sample value (described later) for the given optical disc. The controller 180 stores the determined values internally, and outputs them to the sampling processor 140 and pulse current generator 160.

Next, the sampling processor 140 and sampling process according to this embodiment will be described with reference to FIG. 4. FIG. 4 is a diagram illustrating the sampling process.

The sampling processor 140 according to this embodiment receives a voltage value which represents the intensity level of the single-pulses emitted at the erase level from the semiconductor laser output controller 110 with a predetermined timing, acquires the voltage value of the single-pulses as a sample value, calculates the error between the acquired sample value and a preset target value, and generates a control voltage for negative feedback control of the laser beam based on the error.

Normally, multi-pulses consist of a plurality of pulses which alternate between the write level or erase level and a lower intensity level, and thus it is not possible to obtain a sample value at a stable intensity level.

Even in the case of single-pulses, the pulse waveform is not stable immediately after conversion from multi-pulses because of deficiencies with the photodetector 120 or with frequency characteristics or a transmission path during current-to-voltage conversion, and thus because of the value during this period is not suited, it is suitable for this value to be acquired as a sample value by the sampling processor 140.

Thus, for a sampling operation, it is desirable for the sampling processor 140 to extract the sample value during a period in which the waveform of single-pulses is sufficiently stable.

For example, when using erase pulses for a sampling operation, if the erase pulses are multi-pulses as shown in FIG. 4A, the voltage level of the detection voltage inputted in the sampling processor 140 becomes unstable.

Consequently, in this case, just before and after the sampling processor 140 acquires a sample value, the control voltage outputted from the sampling processor 140 is prone to error. Thus, the sampling processor 140 cannot perform the sampling process properly.

On the other hand, if the erase pulses are single-pulses as shown in FIG. 4B, the voltage level of the detection voltage inputted in the sampling processor 140 becomes stable. Consequently, even just before and after the sampling processor 140 acquires a sample value, the control voltage outputted from the sampling processor 140 remains constant. Thus, the sampling processor 140 can perform the sampling process properly.

Therefore, according to this embodiment, when the controller 180 makes the pulse current generator 160 convert erase pulses into single-pulses, the controller 180 makes the sampling processor 140 generate sampling pulses a set amount of time earlier than the fall time of the erase pulses formed by the single-pulse. At the same time, the controller 180 makes the sampling processor 140 sample the detection voltage level inputted in the sampling processor 140, as a sample value.

Specifically, the controller 180 generates sampling pulses during an APC timing period to sample the pulse level as a sample value during a period of certain duration at a time earlier than the fall time of the erase pulses and outputs the sampling pulses to the sampling processor 140.

As shown in FIG. 1, the sampling processor 140 according to this embodiment comprises: a sample-and-hold circuit 141 which holds detection voltage sampled from inputted detection voltage during a predetermined period; a sampling voltage storage 142 which prestores the voltage value at a targeted erase level of the laser beam (hereinafter this voltage value will be referred to as the targeted sampling erase voltage); a subtractor 143 which subtracts the sampled and held detection voltage (hereinafter referred to as the sample-and-hold voltage) from each targeted sampling voltage for calculating the error; a integrator 144 which integrates the voltages resulting from the subtraction; and a sample-and-hold controller 145 which controls the sample-and-hold circuit 141 based on the APC timing pulses and sampling pulses outputted from the controller 180.

Incidentally, for example, the sampling voltage storage 142 serves as the storage device according to the present invention.

The sample-and-hold circuit 141 receives the detection voltage outputted from the first converter 130, holds the inputted detection voltage at the voltage value assumed at a time specified by the sample-and-hold controller 145, and outputs the held value (sample value) to the subtractor 143.

Incidentally, the sample-and-hold circuit 141 holds the sample value until the time specified by the sample-and-hold controller 145, i.e., until the next sample pulse is input, and then outputs the sample value to the subtractor 143.

In the sampling voltage storage 142, the voltage value at a targeted erase level of the laser beam (hereinafter this voltage value will be referred to as the targeted sampling erase voltage) is stored. The sampling voltage storage 142 outputs the targeted sampling erase voltage to the subtractor 143 at the instruction of the sample-and-hold controller 145.

For example, the sampling voltage storage 142 generates a preset sample value which will serve as a target value (hereinafter referred to as the target sample value). At the instruction of the controller 180, it generates targeted erase voltage when performing OPC (Optimized Power Control) to determine optimum conditions for a disc write operation by writing on a trial basis at the beginning of the write operation to each optical disc, and stores the targeted erase voltage which is generated in the inside.

The subtractor 143 receives the sample value outputted from the sample-and-hold circuit 141 and the target sample value outputted from the sampling voltage storage 142, subtracts the inputted sample value from the inputted target sample value, and outputs the voltage value obtained by the subtraction to the integrator 144.

The integrator 144 receives the voltage values outputted from the subtractor 143, integrates the inputted voltage values, thereby extracting low-frequency components, i.e., averaging the inputted voltage values, and outputs the resulting value to the first adding unit 160.

The sample-and-hold controller 145 receives the APC timing pulse and sampling pulses outputted from the controller 180 and controls the sample-and-hold circuit 141 and the sampling voltage storage 142 based on the APC timing pulse and sampling pulses outputted from the controller 180.

Next, description will be given of a negative feedback control operation in an APC area on the optical pickup apparatus 100 according to this embodiment during a write operation to a writable optical disc, with reference to FIGS. 5 to 7.

Figure 6:
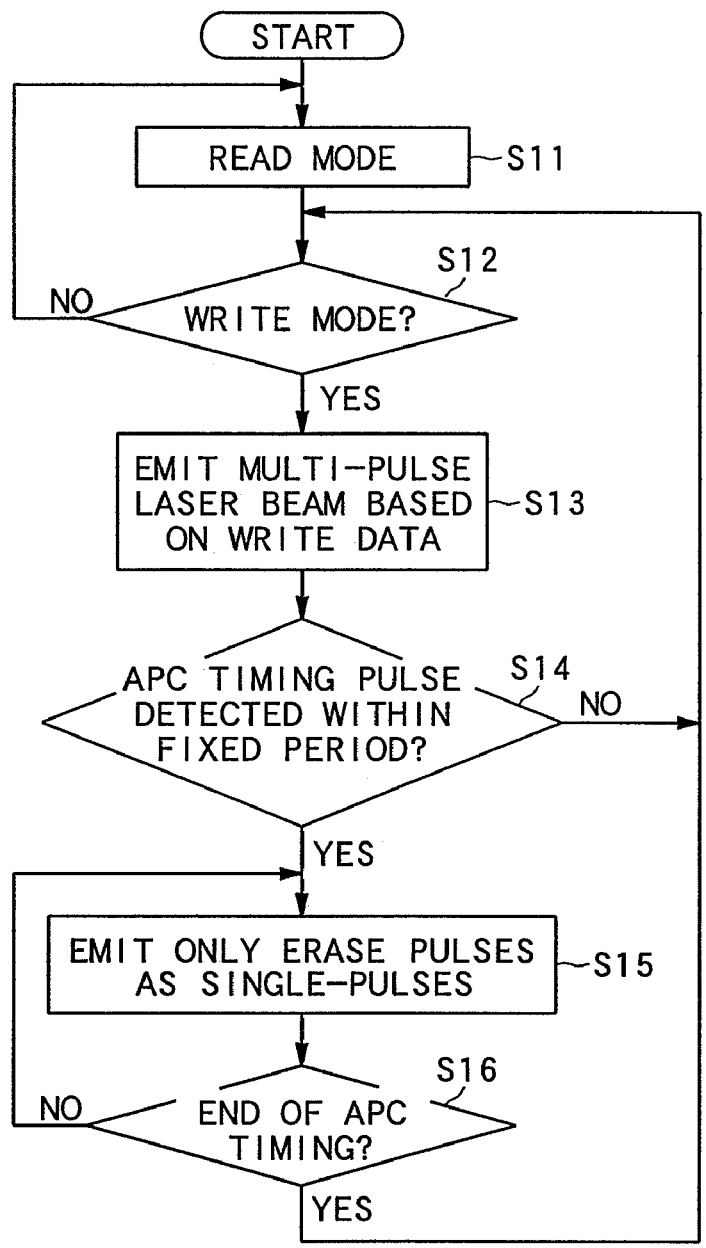
FIG. 6 is a flowchart showing a negative feedback operation (output switching control) according to the first embodiment.
Figure 7:
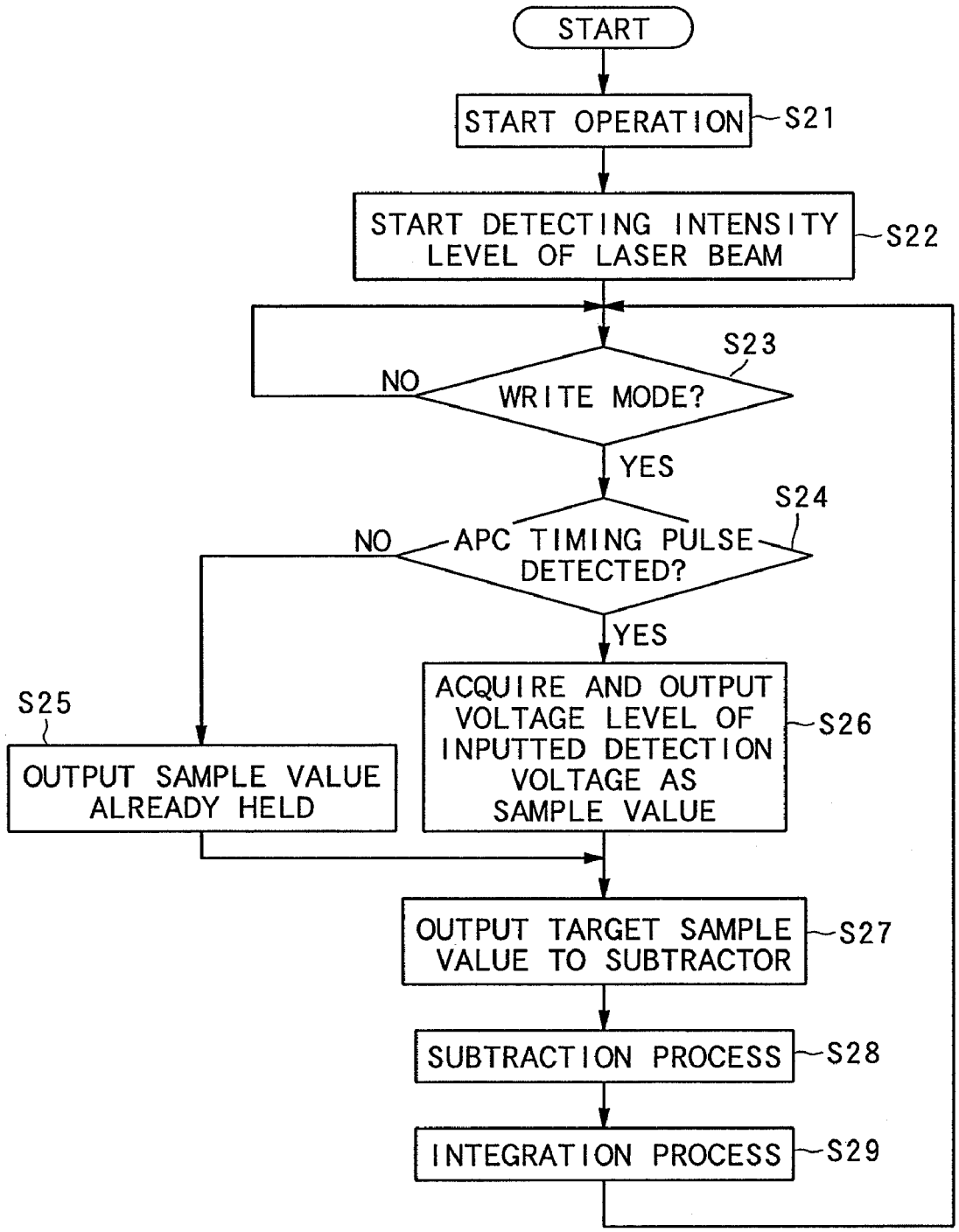
FIG. 7 is a flowchart showing a negative feedback operation (sampling process) according to the first embodiment.

FIG. 5 is a diagram illustrating a negative feedback operation during a write operation according to this embodiment, FIG. 6 is a flowchart showing an output switching control operation for the laser beam according to this embodiment, and FIG. 7 is a flowchart showing a sampling operation according to this embodiment.

As shown in FIG. 5, according to this embodiment, in write mode in which data is written on the optical disc, the controller 180 makes erase pulses generated as single-pulses during an APC timing period based on the APC timing pulse and the sampling pulses, causes the erase pulses of the laser beam emitted as single-pulse in sync with the sampling pulses to be detected, and thereby performs the sampling process described above.

As described above, the optical pickup apparatus 100 according to this embodiment sets an APC timing in regular cycles based on the address information recorded beforehand in a lead-in area of the optical disc to indicate the position of APC areas and on the address information recorded beforehand on the optical disc, and generates an APC timing pulse and sampling pulses with this timing.

According to this embodiment, a negative feedback control operation is performed by the controller 180 through the operation of switching the pulse form of the laser beam (hereinafter referred to as the output switching control operation) and a sampling operation performed concurrently with the output switching control operation.

First, the output switching control operation according to this embodiment will be described with reference to FIG. 6.

To begin with, by controlling the pulse current generator 160 and semiconductor laser output controller 110, the controller 180 makes the semiconductor laser output controller 110 emit single-pulse laser beam at the read level to read address information and the like recorded in the lead-in area of the optical disc in advance or to read pre-address information recorded in a write area of the optical disc if this processing of the controller 180 is performed after the process of Step S12 is performed (Step S11 (read mode)).

At this time, the optical pickup apparatus 100 as a whole reads data from the optical disc by controlling a spindle motor controller for controlling a spindle motor (not shown), a decoder for decoding read data, etc. and stores APC timing data, prerecorded address information, or the like in a memory (not shown).

Next, the controller 180 judges whether or not the optical pickup apparatus 100 is in write mode, based on instructions from a central control processor (not shown) which controls the entire optical pickup apparatus 100 (Step S12).

Specifically, if the optical pickup apparatus 100 is now in read mode, the controller 180 judges whether to switch from read mode to write mode. If the optical pickup apparatus 100 is now in write mode, the controller 180 judges whether or not the optical pickup apparatus 100 has switched from write mode to read mode. If the optical pickup apparatus 100 is already in write mode, the controller 180 judges whether or not it will remain in write mode.

For example, if the user enters a command instructing the central control processor to record content information on the optical disc or stop recording, or the central control processor detects a command to record content information on the optical disc or stop recording when a predetermined time elapses, the central control processor indicates the current mode—write mode or read mode—to the controller 180, and the controller 180 judges based on this whether or not the optical pickup apparatus 100 is in write mode.

If it is judged that the optical pickup apparatus 100 will remain in write mode or that the optical pickup apparatus 100 will switch from write mode to read mode, the controller 180 performs the process of Step S11, and the controller 180 makes the semiconductor laser output controller 110 emit the laser beam at the read level by controlling the pulse current generator 160 and semiconductor laser output controller 110.

On the other hand, if it is judged, based on instructions from the central control processor (not shown), that the optical pickup apparatus 100 has switched from read mode to write mode or will remain in write mode, the controller 180 performs the following operations.

First, the controller 180 makes the pulse current generator 160 generate current pulses to emit the multi-pulse laser beam based on modulated data and makes the semiconductor laser output controller 110 emit the generated laser beam (Step S13).

Specifically, by controlling the pulse current generator 160 and semiconductor laser output controller 110, the controller 180 does the following: if modulated data for forming marks on the optical disc is entered, the controller 180 makes the semiconductor laser output controller 110 emit the write pulses laser beam of multi-pulse to the optical disc in accordance with the modulated data; and if modulated data for forming spaces on the optical disc is entered, the controller 180 makes the semiconductor laser output controller 110 emit the erase pulses laser beam of multi-pulse to the optical disc in accordance with the modulated data.

Incidentally, the process of Step S13 is performed during a non-APC timing period. During a non-APC timing period like this, the controller 180 makes the sampling processor 140 generate control voltage and output control current by performing subtraction and integration of sample values being held.

Thus, the adding unit 170 adds the control current which is generated by adding the sampled control voltage and the currents generated by the pulse current generator 160, and the semiconductor laser output controller 110 controls the light intensity level of the laser beam based on the adding control currents.

Next, the controller 180 judges whether or not an APC timing pulse generated internally within a fixed period has been detected (Step S14). If no APC timing pulse is detected, the controller 180 performs the process of Step S12.

On the other hand, if the controller 180 detects an APC timing pulse within the fixed period, the controller 180 outputs the APC timing pulse and the sampling pulses to the sampling processor 140 and the pulse current generator 160. Furthermore, the controller 180 makes the sampling processor 140 and the pulse current generator 160 generate only erase pulses as single-pulses during the APC timing period, and makes the semiconductor laser output controller 110 emit the laser beam by switching between the write pulses of multi-pulse and the erase pulses of single-pulse (Step S15).

Specifically, the controller 180 makes the pulse current generator 160 generate the write pulses of multi-pulse and the erase pulses of single-pulse and the semiconductor laser output controller 110 emit the single-pulse laser beam and the multi-pulse laser beam.

Next, the controller 180 judges whether the APC timing period ended, by checking for an APC timing pulse (Step S16). If the APC timing period has not ended yet, the controller 180 performs the process of Step S15. If the APC timing period has ended, the controller 180 performs the process of Step S12.

Incidentally, details of control current generation control in the sampling operations will be described later.

In this way, when writing data on an optical disc, the controller 180 according to this embodiment controls the light intensity of the laser beam emitted from the semiconductor laser output controller 110 and controls the pulse form of the laser beam by switching it.

Next, operations of the sampling processor 140 and operations of relevant parts will be described with reference to FIG. 7.

When the optical pickup apparatus 100 starts operation (Step S21), the photodetector 120 detects the laser beam outputted from the semiconductor laser output controller 110 and outputs the intensity level of the laser beam to the sampling processor 140 via the first converter 130 (Step S22).

Incidentally, as long as the semiconductor laser output controller 110 outputs laser beam, the photodetector 120 detects the emitted laser beam.

Next, based on instructions from the central control processor (not shown), the controller 180 judges whether or not the optical pickup apparatus 100 is in write mode (Step S23).

Specifically, like in Step S12 of the output switching control operation, based on instructions from the central control processor (not shown), the controller 180 judges whether or not the optical pickup apparatus 100 has switched from read mode to write mode or whether or not the optical pickup apparatus 100 has switched from write mode to read mode. If the optical pickup apparatus 100 is already in write mode, the controller 180 judges whether or not it will remain in write mode.

If the controller 180 is judged that the optical pickup apparatus 100 is in write mode, the controller 180 notifies the sampling processor 140 to that effect. Then, the sampling processor 140 performs the sampling process described below.

When the optical pickup apparatus 100 enters write mode, the controller 180 outputs generated APC timing pulses and sampling pulses to the sample-and-hold controller 145 with their timings.

First, the sample-and-hold controller 145 judges whether or not an APC timing pulse is entered within a fixed period or whether or not APC timing pulses are detected continuously (Step S24). If no APC timing pulse is detected within the fixed period or no APC timing pulse has been detected yet, the sample-and-hold controller 145 makes the sample-and-hold circuit 141 output the sample value it holds to the subtractor 143 (Step S25) and performs the processes in Step S27.

Incidentally, according to this embodiment, the sample value held by the sample-and-hold circuit 141 defaults to "0."

When the optical pickup apparatus 100 starts operation (Step S21), the photodetector 120 detects the laser beam outputted from the semiconductor laser output controller 110 and outputs the intensity level of the laser beam to the sampling processor 140 via the first converter 130 (Step S22).

Incidentally, as long as the semiconductor laser output controller 110 outputs the laser beam, the photodetector 120 detects the emitted the laser beam.

Next, based on instructions from the central control processor (not shown), the controller 180 judges whether or not the optical pickup apparatus 100 is in write mode (Step S23).

Specifically, like in Step S12 of the output switching control operation, based on instructions from the central control processor (not shown), the controller 180 judges whether or not the optical pickup apparatus 100 has switched from read mode to write mode or whether or not the optical pickup apparatus 100 has switched from write mode to read mode. If the optical pickup apparatus 100 is already in write mode, the controller 180 judges whether or not it will remain in write mode.

If it is judged that the optical pickup apparatus 100 is in write mode, the controller 180 notifies the sampling processor 140 to that effect. Then, the sampling processor 140 performs the sampling process (described below).

When the optical pickup apparatus 100 enters write mode, the controller 180 outputs generated APC timing pulses and sampling pulses to the sample-and-hold controller 145 with their timings.

First, the sample-and-hold controller 145 judges whether or not an APC timing pulse is entered within a fixed period (Step S24). If no APC timing pulse is detected within the fixed period (a non-APC timing period), the sample-and-hold controller 145 makes the sample-and-hold circuit 141 output the sample value it holds to the subtractor 143 (Step S25) and performs the process of Step S27.

Incidentally, according to this embodiment, the sample value is held by the sample-and-hold circuit 141 defaults to "0."

If an APC timing pulse is detected within the fixed period or an APC timing pulse is detected continuously (an APC timing period), the sample-and-hold controller 145 makes the sample-and-hold circuit 141 acquire, as a sample value, the voltage level of detection voltage inputted based on the sample pulses outputted from the controller 180 and makes the sample-and-hold circuit 141 output the acquired sample value to the subtractor 143 (Step S26).

Incidentally, the sample-and-hold circuit 141 holds the acquired sample value until instructed by the sample-and-hold controller 145 to acquire a new sample value.

Next, the sample-and-hold controller 145 makes the sampling voltage storage 142 output the target sample value it stores to the subtractor 143 (Step S27).

Upon receiving the sample value and target sample value, the subtractor 143 subtracts the inputted sample value from the inputted target sample value and outputs the resulting voltage value to the integrator 144 (Step S28).

Upon receiving the voltage value obtained by the subtraction, the integrator 144 integrates the inputted voltage value, generates control voltage, and outputs the generated control voltage to the adding unit 170 (Step S29).

According to this embodiment, when the sampling process is performed in this way, since the adding unit 170 adds the control current and the pulse currents, the semiconductor laser output controller 110 can perform negative feedback control of the light intensity of the laser beam.

As described above; according to this embodiment; the optical pickup apparatus 100 comprises: the semiconductor laser output controller 110 for emitting the laser beam to the optical disc by switching between the multi-pulse laser beam and the single-pulse laser beam, and for emitting single-pulses when recording modulated data of erase pulses on the optical disc during a predetermined APC timing period; the photodetector 120 for detecting the emitted laser beam; the sampling voltage storage 142 for storing target voltages; the sampling processor 140 for acquiring the light intensity level of the detected laser beam as a sampling value and calculates error between stored target voltages and the acquired sample value when recording the modulated data of the erase pulses; and the controller 180 for controlling the output intensity level of the laser beam emitted from the semiconductor laser output controller 110; based on the calculated error.

According to this embodiment with the above configuration, when recording the write data on an optical disc by modulating the intensity level of the laser beam outputted from a semiconductor laser, since the optical pickup apparatus 100 can use the multi-pulse laser beam and acquire the sample values using the laser beam with a stable waveform, it can control the semiconductor laser output controller 110 which emits the laser beam, based on the sample values which allow the light intensity level of the laser beam to be grasped exactly, and can change intensity levels or irradiation times of the laser beam easily and independently.

That is, with the average APC method (averaging process) which uses the average value of light intensity levels within a fixed period as a basis for negative feedback control, since the intensity levels, i.e., the erase level and write level, of the laser beam emitted from the semiconductor laser must be changed for each optical disc because of manufacturing variations in optical discs, variations in data write conditions, etc. Therefore, if one of the intensity levels is changed while keeping the target value constant, the other intensity level is changed as well.

Specifically, as shown in FIG. 8A, when writing data on a rewritable optical disc, if the level of erase pulses (or the level of write pulses) alone are changed while keeping the target value for negative feedback control constant at the output level of the laser beam of the semiconductor laser, the level of write pulses (or the level of erase pulses) is changed as well.

Normally, when writing information on an optical disc, if the write pulses of multi-pulse or erase pulses of multi-pulse are used, the duty ratio (irradiation time of laser beam) of the multi-pulses needs to be changed for each optical disc because of heat buildup on the optical disc.

However, with the average APC method, if the duty ratio of write pulses are changed with the target value which serve as a basis for negative feedback control kept constant as shown in FIG. 8B, the peak power of the write pulses of multi-pulse is changed because an average value over a set period is used as the target value.

On the other hand, as described above, according to this embodiment, even if the light intensity level and the duty ratio of only write pulses or erase pulses are changed, the intensity levels of other pulses are not affected. Consequently, intensity levels to be modulated or irradiation times can be changed easily and independently, making it possible to improve the accuracy of OPC operations.

Also, according to this embodiment, since the controller 180 can properly perform a sampling process which serves as a basis for negative feedback control during an APC timing period even if the optical pickup apparatus 100 sets APC timing based on address information or on its own, the accuracy of negative feedback control can be improved if the APC timing is set in such a way as to increase the frequency of the sampling process.

Also, according to this embodiment, the optical pickup apparatus 100 randomly changes the site irradiated with the laser beam each time data is recorded, by setting and changing the APC timing on its own instead of directing laser beam for sampling to a fixed site on the optical disc, and thus it can improve the durability of a recording film on the optical disc.

In other words, the sampling process requires laser beam to be emitted as single-pulses, and if single-pulse laser beam with high heat buildup is directed to the same site on the optical disc each time data is recorded, the recording film will deteriorate considerably. However, according to this embodiment, since the optical pickup apparatus 100 can set the APC timing on its own, it can improve the durability of the recording film on the optical disc by changing the site irradiated with single-pulse laser beam each time data is recorded.

Incidentally, APC timing pulses are generated based on the pre-address information prestored on the optical disc according to this embodiment. However, it is also possible to install in the controller 180 a timer and a counter which counts revolutions of a spindle motor (not shown) and generate APC timing pulses with the timer in regular cycles or every predetermined number of revolutions.

According to this embodiment, the optical pickup apparatus 100 controls the emission of laser beam when recording write data on an optical disc. However, if the optical pickup apparatus 100 which comprises the photodetector 120 and semiconductor laser circuit is further equipped with computer and a recording medium, a negative feedback control program may be stored on the recording medium and read by the computer to perform negative feedback control in the manner described above.

Second Embodiment

A second embodiment of the optical pickup apparatus will be described with reference to FIGS. 9 to 12.

The optical pickup apparatus according to this embodiment is characterized in that it uses specific bits for negative feedback control in contrast to use APC timing pulses and sampling pulses for negative feedback control in the first embodiment. In other respects, the optical pickup apparatus according to this embodiment is the same as the first embodiment. Thus, components will be denoted by the same reference numerals as the corresponding components of the first embodiment and description thereof will be omitted.

Figure 9:
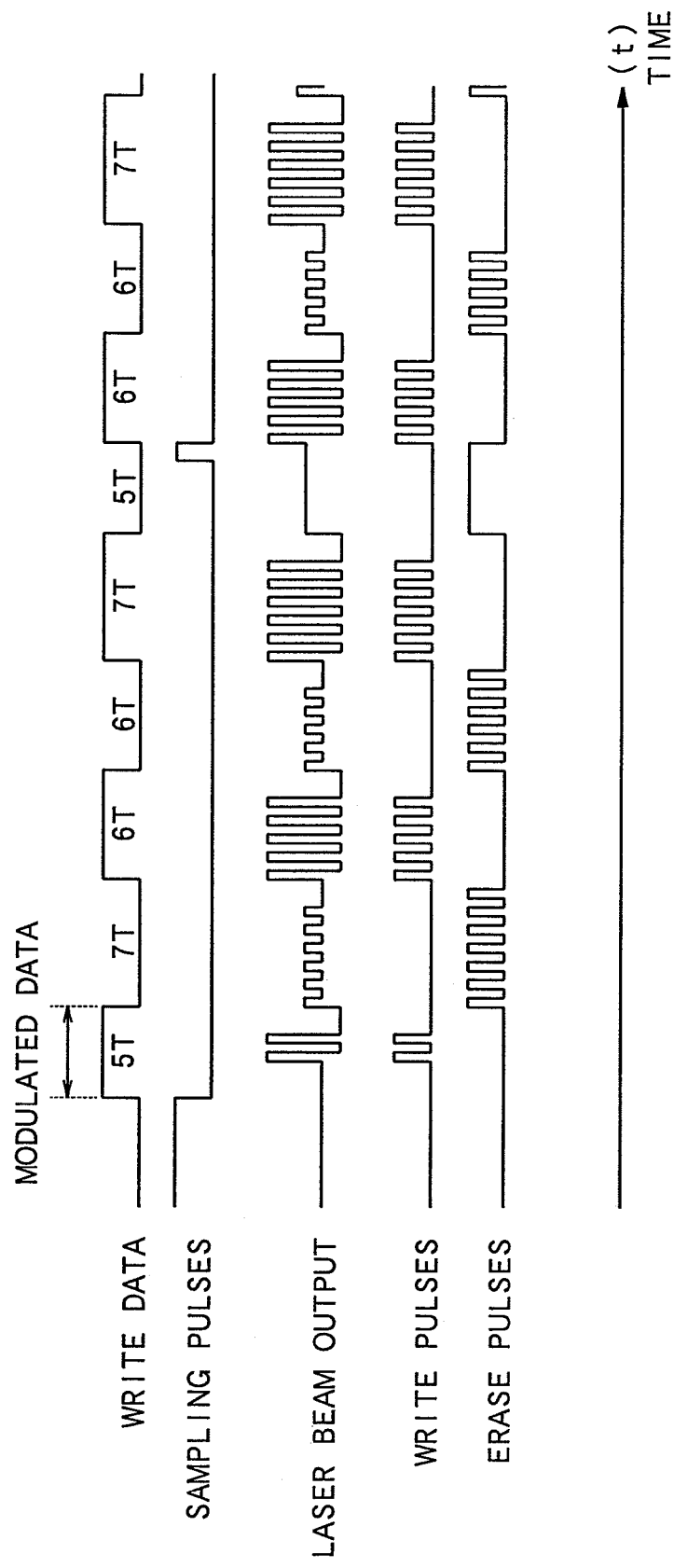
FIG. 9 is a timing chart illustrating a negative feedback control operation according to a second embodiment.
Figure 10:
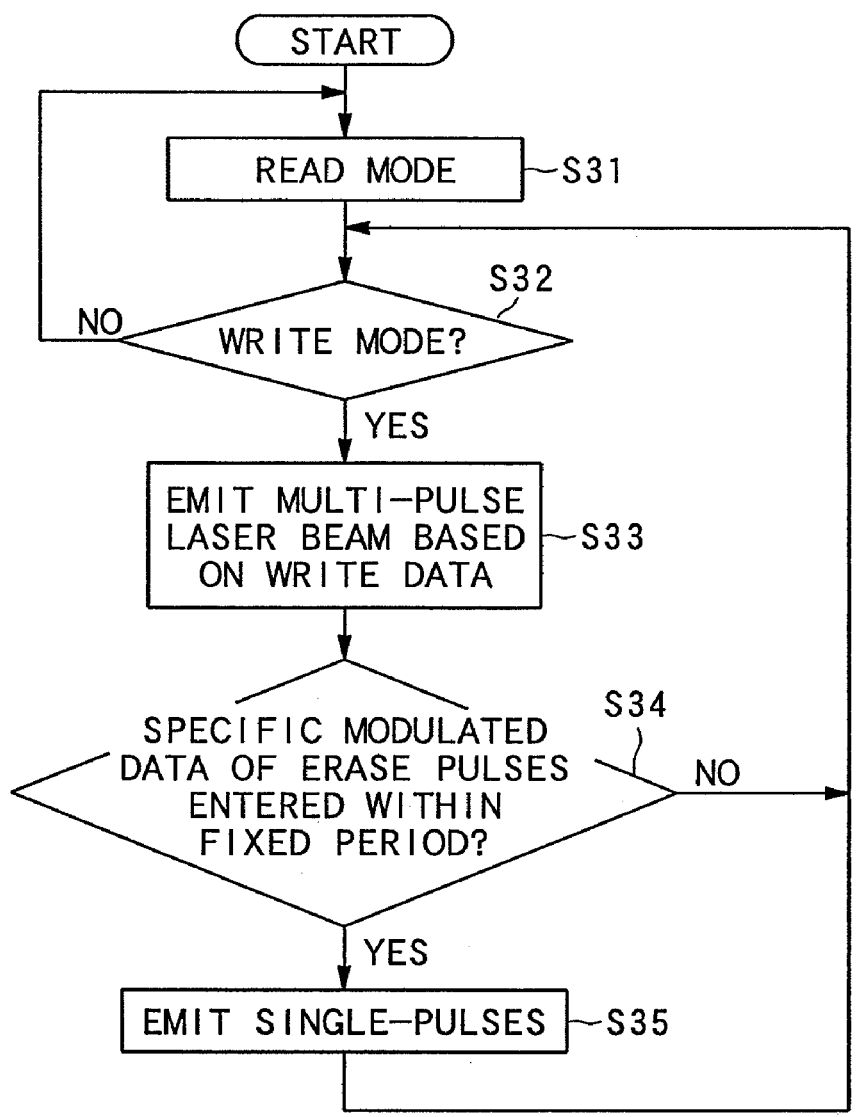
FIG. 10 is a flowchart showing a negative feedback operation (output switching control) according to the second embodiment.
Figure 11:
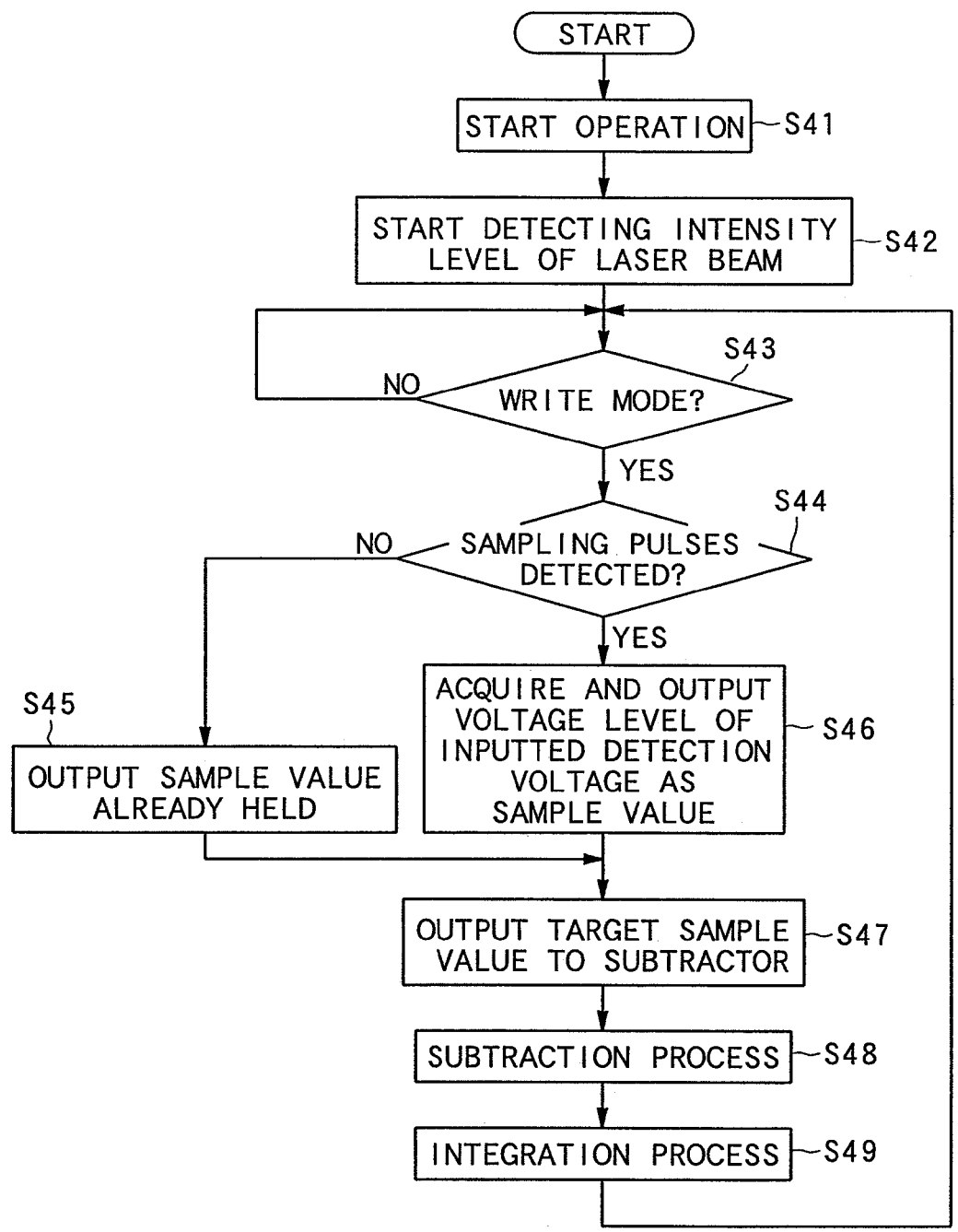
FIG. 11 a flowchart showing a negative feedback operation (sampling process) according to the second embodiment.

FIG. 9 is a diagram illustrating a negative feedback operation during a data write operation according to this embodiment, FIG. 10 is a flowchart showing an output switching control operation for laser beam according to this embodiment, and FIG. 11 is a flowchart showing a sampling operation according to this embodiment.

According to this embodiment, in write mode in which data is written on the optical disc, the controller 180 controls the sampling processor 140 and pulse current generator 160 based on a specific kind of modulated data composed of inputted bits (hereinafter referred to as specific modulated data).

Specifically, as is the case with the first embodiment, the controller 180 receives the write data, generates sampling pulses based on the inputted specific modulated data, and controls the sampling processor 140 and the pulse current generator 160 based on the sampling pulses.

Normally, write data is scrambled or otherwise encrypted when recorded on an optical disc. Consequently, the same kind of modulated data is scattered to some extent and will not appear consecutively for an extended period of time.

Thus, the optical pickup apparatus 100 according to this embodiment can perform a sampling process properly in regular cycles even though it performs the sampling process by generating sampling pulses based on specific modulated data.

Incidentally, according to this embodiment, modulated data with a run length of 5T is used as the specific modulated data. When recording data on the optical disc and reproducing data recorded on the optical disc, for example, if modulated data with a run length of 14T is used as a synchronizing signal and its synchronizing frequency is set to 17 kHz, the 5T-long modulated data will appear with a probability of several times the synchronizing frequency. Thus, according to this embodiment, the use of 5T-long modulated data as the specific modulated data makes it possible to shorten the APC timing period, increasing the frequency of the sampling process, and consequently improve the accuracy of negative feedback control.

Next, negative feedback control according to this embodiment will be described with reference to FIGS. 9 to 11.

As shown in FIG. 9, when the controller 180 according to this embodiment receives 5T-long modulated data which causes erase pulses to be generated, the controller 180 generates the sampling pulses and outputs them to the sampling processor 140 and pulse current generator 160.

Then, the sampling processor 140 performs a sampling process based on the inputted sampling pulses and the pulse current generator 160 generates the erase pulses of single-pulse based on the sampling pulses.

According to this embodiment again, as is the case with the first embodiment, the negative feedback control operation is performed by the controller 180 through the output switching control operation of switching the pulse form of the laser beam and a sampling operation performed concurrently with the output switching control operation.

First, the output switching control operation according to this embodiment will be described with reference to FIG. 10.

To begin with, by controlling the pulse current generator 160 and the semiconductor laser output controller 110, the controller 180 makes the semiconductor laser output controller 110 emit single-pulse laser beam at the read level (Step S31 (read mode)).

Next, the controller 180 judges whether or not the optical pickup apparatus 100 is in write mode, based on instructions from a central control processor (not shown) which controls the entire optical pickup apparatus 100 (Step S32).

If it is judged that the optical pickup apparatus 100 will remain in read mode or that the optical pickup apparatus 100 will switch from write mode to read mode, the controller 180 performs the process of Step S31, where the controller 180 makes the semiconductor laser output controller 110 emit the laser beam at the read level, by controlling the pulse current generator 160 and semiconductor laser output controller 110.

On the other hand, if it is judged, based on instructions from the central control processor (not shown), that the optical pickup apparatus 100 has switched from read mode to write mode or will remain in write mode, the controller 180 performs the following operations.

First, by controlling the semiconductor laser output controller 110 and the pulse current generator 160, the controller 180 makes the semiconductor laser output controller 110 emit the multi-pulse laser beam based on modulated data (Step S33).

In the process of Step S33, if no sampling pulse is generated during a given period, the sampling processor 140 generates and outputs control voltage by performing subtraction and integration of sample values being held. Thus, the semiconductor laser output controller 110 adds the control voltage to the currents generated by the pulse current generator 160 and the light intensity level of the laser beam is controlled based on the results of the addition.

Next, the controller 180 judges whether or not the 5T-long specific modulated data constituting erase pulses is entered within a fixed period (Step S34). If no such data is detected, the controller 180 performs the process of Step S32.

On the other hand, if the 5T-long specific modulated data constituting erase pulses is detected within the fixed period, the controller 180 outputs sampling pulses to the sampling processor 140 and pulse current generator 160, converts the modulated data into single-pulses, makes the semiconductor laser output controller 110 emit the single-pulse laser beam (Step S35), and performs the process of Step S32.

Incidentally, operations of the sampling processor 140 and operations of relevant parts will be described in detail later.

In this way, when writing data on an optical disc, this embodiment controls the light intensity of the laser beam emitted from the semiconductor laser output controller 110 and controls the pulse form of the laser beam by switching it.

Next, operations of the sampling processor 140 according to this embodiment and operations of relevant parts will be described with reference to FIG. 11.

When the optical pickup apparatus 100 starts operation (Step S41), the photodetector 120 detects laser beam outputted from the semiconductor laser output controller 110 and outputs the intensity level of the detected laser beam to the sampling processor 140 via the first converter 130 (Step S42).

Next, based on instructions from the central control processor (not shown), the controller 180 judges whether or not the optical pickup apparatus 100 is in write mode (Step S43).

If it is judged that the optical pickup apparatus 100 is in write mode, the controller 180 notifies the sampling processor 140 that the optical pickup apparatus 100 is in write mode. Then, the sampling processor 140 performs the sampling process described below.

When the optical pickup apparatus 100 enters write mode, the controller 180 outputs generated sampling pulses to the sample-and-hold controller 145 with their timings.

First, the sample-and-hold controller 145 judges whether or not sampling pulses are entered within a fixed period (Step S44). If no sampling pulse is detected within the fixed period, the sample-and-hold controller 145 makes the sample-and-hold circuit 141 output the sample value it holds to the subtractor 143 (Step S45) and performs the process of Step S47.

Incidentally, according to this embodiment, the sample value held by the sample-and-hold circuit 141 defaults to "0."

If sampling pulses are detected within the fixed period, the sample-and-hold controller 145 makes the sample-and-hold circuit 141 acquire, as a sample value, the voltage level of inputted detection voltage based on the sample pulses outputted from the controller 180 and makes it output the acquired sample value to the subtractor 143 (Step S46).

Incidentally, the sample-and-hold circuit 141 holds the acquired sample value until instructed by the sample-and-hold controller 145 to acquire a new sample value.

Next, the sample-and-hold controller 145 makes the sampling voltage storage 142 output the target sample value it stores to the subtractor 143 (Step S47).

Upon receiving the sample value and the target sample value, the subtractor 143 subtracts the inputted sample value from the inputted target sample value and outputs the resulting voltage value to the integrator 144 (Step S48).

Upon receiving the voltage value obtained by the subtraction, the integrator 144 integrates the inputted voltage value, generates control voltage, and outputs the generated control voltage to the adding unit 160 (Step S49). Then, the sample-and-hold controller 145 performs the process of Step S43.

According to this embodiment, when the sampling process is performed in this way, since the adding unit 170 adds the control current and the pulse currents, the semiconductor laser output controller 110 can perform negative feedback control of the light intensity of the laser beam.

As described above, according to this embodiment, the optical pickup apparatus 100 comprises: the semiconductor laser output controller 110 for emitting the laser beam to the optical disc by switching between the multi-pulse laser beam and the single-pulse laser beam, and for emitting the single-pulses when recording specific modulated data on the optical disc; the photodetector 120 for detecting the emitted the laser beam; the sampling voltage storage 142 for storing the target voltages; the sampling processor 140 for acquiring the light intensity level of the detected laser beam as a sampling value and calculates error between the stored target voltages and the acquired sample value when recording the specific modulated data; and the controller 180 for controlling the output intensity level of the laser beam emitted from the semiconductor laser output controller 110, based on the calculated error.

According to this embodiment with the above configuration, as is the case with the first embodiment, when recording the write data on an optical disc by modulating the intensity level of the laser beam outputted from a semiconductor laser, since the optical pickup apparatus 100 can use the multi-pulse laser beam and acquire the sample values using the laser beam with a stable waveform, it can control the semiconductor laser output controller 110 which emits the laser beam, based on the sample values which allow the light intensity level of the laser beam to be grasped exactly, and can change intensity levels or irradiation times of the laser beam easily and independently.

Also, according to this embodiment, since a sampling process can be performed based on modulated data with a specific run length the sampling process can be performed properly and if the specific modulated data is set in such a way as to increase the number of times of the sampling process, the accuracy of negative feedback control can be improved.

Also, according to this embodiment, the optical pickup apparatus 100 performs the emission of the single-pulse laser beam to the optical disc based on specific modulated data. Therefore, the single-pulse laser beam with high heat buildup is not emitted to a fixed site on the optical disc, and changing the site irradiated with the laser beam each time data is recorded. Furthermore, when the single-pulse laser beam is emitted, the single-pulse laser beam is emitted to different site each time data is recorded. Thus, the durability of a recording film on the optical disc can be improved.

According to this embodiment, the erase pulses are emitted as single-pulses when recording 5T-long modulated data constituting the erase pulses (an erase interval). However, the run length cited here is not restrictive, and modulated data with a shorter or longer run length may also be used.

Figure 12:
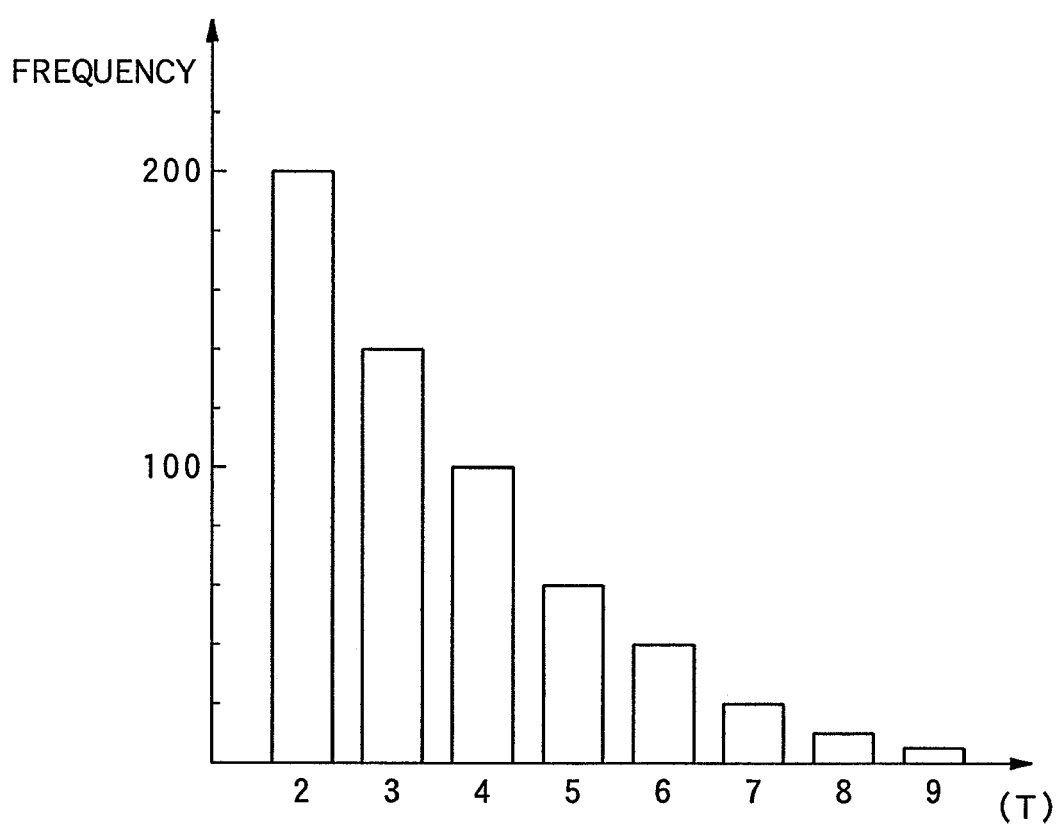
FIG. 12 is a graph showing kinds of modulated data and frequency of their occurrence.

In that case, as shown in FIG. 12, if a short run length such as 2T or 3T is used, the modulated data appears relatively frequently during an APC timing period, and thus the output light intensity of laser beam can be controlled at short intervals. If a long run length such as 10T or 11T is used, although modulated data appears less frequently during an APC timing period, a single pulse becomes relatively long, making it possible to obtain even more stable sample values.

Incidentally, when using modulated data of a relatively long run length such as 10T or 11T, single-pulses may be emitted for different kinds of modulated data with a different run length. This will increase the frequency of sampling.

According to this embodiment, the optical pickup apparatus 100 controls the emission of laser beam when recording write data on an optical disc. However, if the optical pickup apparatus 100 which comprises the photodetector 120 and semiconductor laser circuit is further equipped with computer and a recording medium, a negative feedback control program may be stored on the recording medium and read by the computer to perform negative feedback control in the manner described above.

Third Embodiment

A third embodiment of the optical pickup apparatus will be described with reference to FIGS. 13 to 15.

The optical pickup apparatus according to this embodiment is characterized in that generates sampling pulses is generated for negative feedback control based solely on modulated data during an APC timing period in contrast to use the APC timing pulses and the sampling pulses for negative feedback control like the first embodiment in other periods. In other respects, the optical pickup apparatus 100 according to this embodiment is the same as the first embodiment. Thus, components will be denoted by the same reference numerals as the corresponding components of the first embodiment and description thereof will be omitted.

Figure 13:
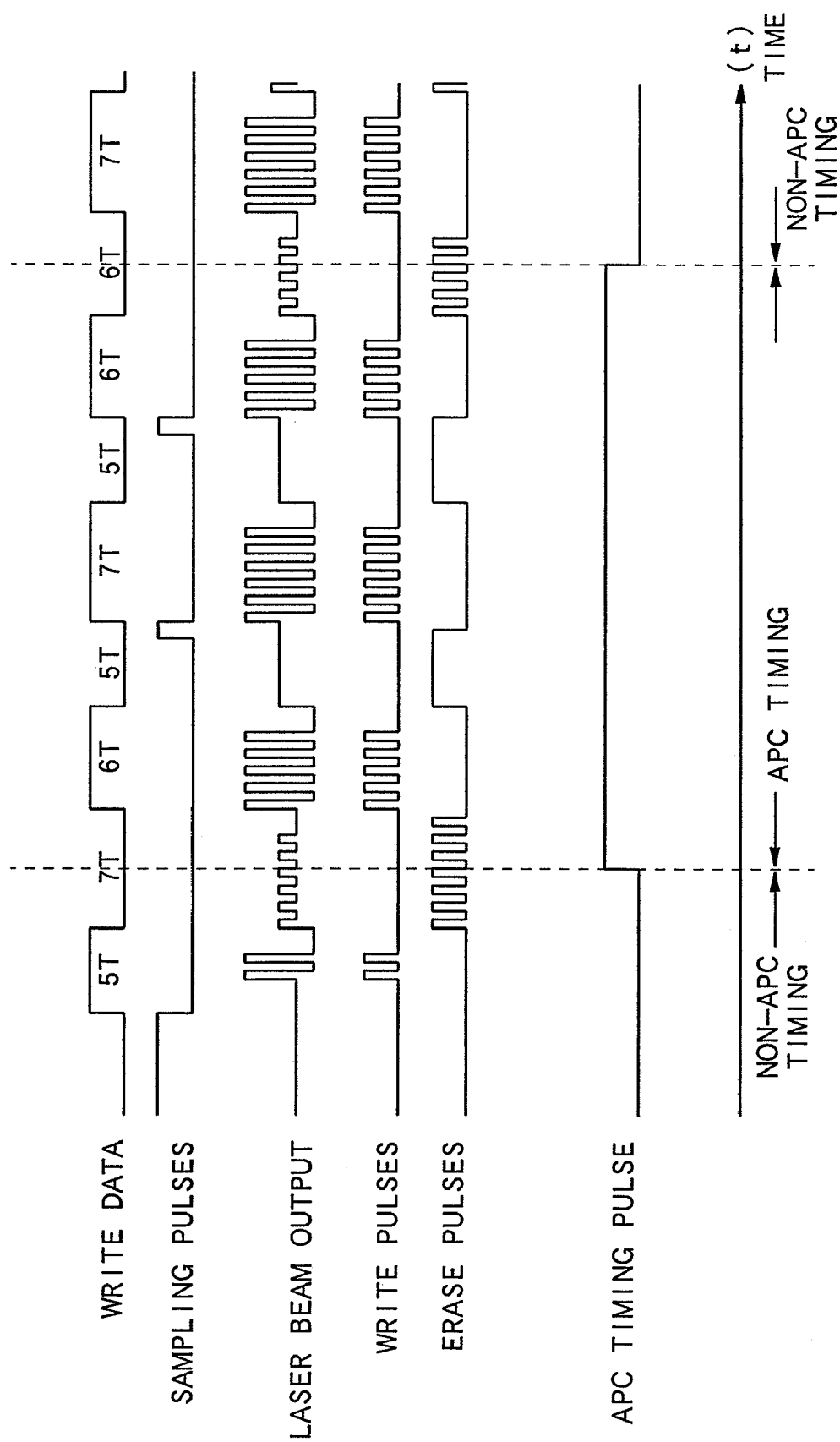
FIG. 13 is a timing chart illustrating a negative feedback control operation according to a third embodiment.
Figure 14:
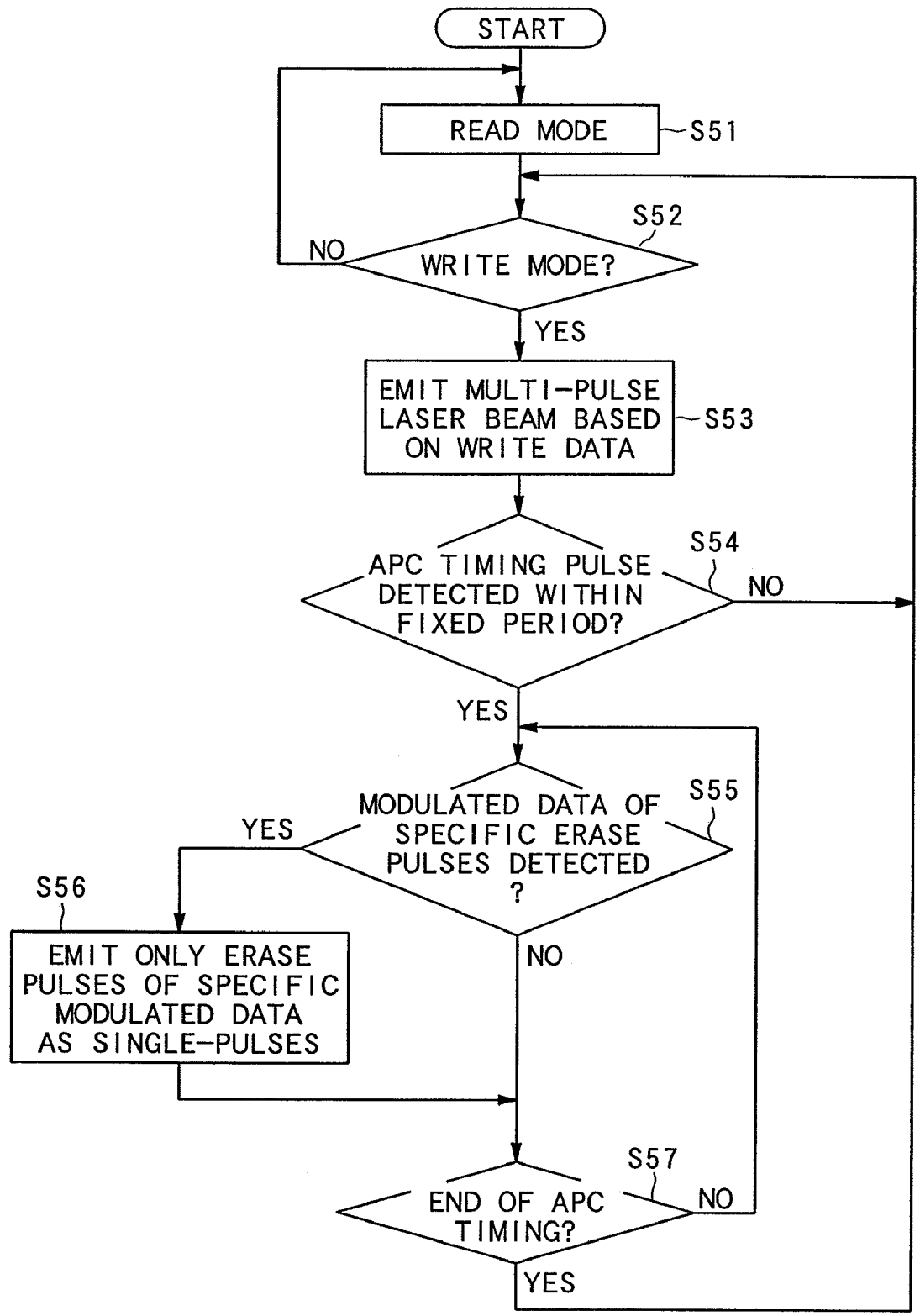
FIG. 14 is a flowchart showing a negative feedback operation (output switching control) according to the third embodiment.
Figure 15:
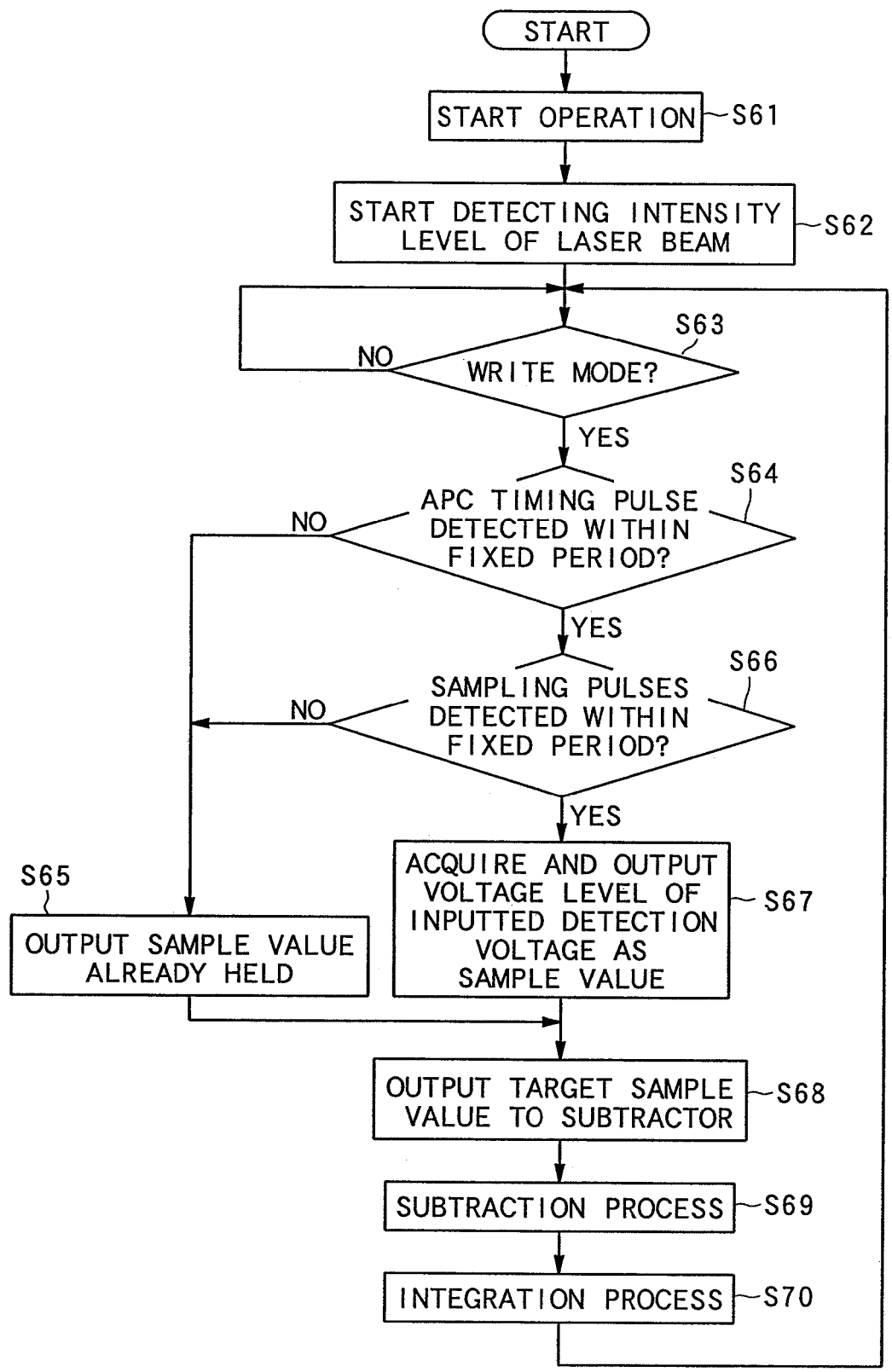
FIG. 15 a flowchart showing a negative feedback operation (sampling process) according to the third embodiment.

FIG. 13 is a diagram illustrating a negative feedback operation during a data write operation according to this embodiment, FIG. 14 is a flowchart showing an output switching control operation for the laser beam according to this embodiment, and FIG. 15 is a flowchart showing a sampling operation according to this embodiment.

According to this embodiment, in write mode in which data is written on the optical disc, the sampling processor 140 and the pulse current generator 160 are controlled during an APC timing period based on modulated data constituting inputted write data.

Specifically, as is the case with the first embodiment, the controller 180 receives modulated data, generates sampling pulses based solely on the specific modulated data inputted during an APC timing period, and controls the sampling processor 140 and the pulse current generator 160 based on the sampling pulses.

Incidentally, according to this embodiment, the 5T-long modulated data is used as the specific modulated data.

Next, negative feedback control according to this embodiment will be described with reference to FIGS. 13 to 15.

As shown in FIG. 13, when the controller 180 according to this embodiment receives the 5T-long modulated data during an APC timing period, and if the 5T-long modulated data causes erase pulses to be generated, the controller 180 generates the sampling pulses and outputs them to the sampling processor 140 and the pulse current generator 160. Then, the sampling processor 140 performs a sampling process based on the inputted sampling pulses and the pulse current generator 160 generates single-pulse erase pulses based on the sampling pulses.

According to this embodiment again, as is the case with the first embodiment, the negative feedback control operation is performed by the controller 180 through the output switching control operation of switching the pulse form of laser beam and a sampling operation performed concurrently with the output switching control operation.

First, the output switching control operation according to this embodiment will be described with reference to FIG. 14.

To begin with, by controlling the pulse current generator 160 and the semiconductor laser output controller 110, the controller 180 makes the semiconductor laser output controller 110 emit the single-pulse laser beam at the read level (Step S51 (read mode)).

Next, the controller 180 judges whether or not the optical pickup apparatus 100 is in write mode, based on instructions from a central control processor (not shown) which controls the entire optical pickup apparatus 100 (Step S52).

If it is judged that the optical pickup apparatus 100 will remain in read mode or that the optical pickup apparatus 100 will switch from write mode to read mode, the controller 180 performs the process of Step S51. Furthermore, the controller 180 makes the semiconductor laser output controller 110 emit the laser beam at the read level, by controlling the pulse current generator 160 and the semiconductor laser output controller 110.

On the other hand, if it is judged, based on instructions from the central control processor (not shown), that the optical pickup apparatus 100 has switched from read mode to write mode or will remain in write mode, the controller 180 performs the following operations.

First, by controlling the semiconductor laser output controller 110 and the pulse current generator 160, the controller 180 makes the semiconductor laser output controller 110 emit the multi-pulse laser beam based on modulated data (Step S53).

In the process of Step S53, during a non-APC timing period, or even during an APC timing period if no sampling pulse is generated, the sampling processor 140 generates and outputs control voltage by performing subtraction and integration of sample values being held. The semiconductor laser output controller 110 adds the control voltage to the currents generated by the pulse current generator 160 and the light intensity level of the laser beam is controlled based on the results of the addition.

Next, the controller 180 judges whether or not an APC timing pulse is detected within a fixed period (Step S54). If no APC timing pulse is detected, the controller 180 performs the process of Step S52.

On the other hand, if an APC timing pulse is detected within the fixed period, the controller 180 judges whether or not the modulated detection data is the 5T-long specific modulated data constituting erase pulses (Step S55). If the modulated data is not the 5T-long specific modulated data or if the modulated data constitutes write pulses even if it is 5T-long specific modulated data, the controller 180 performs the process of Step S57.

If the 5T-long specific modulated data constituting erase pulses is detected, the controller 180 outputs sampling pulses to the sampling processor 140 and the pulse current generator 160, converts the modulated data into single-pulses, and makes the semiconductor laser output controller 110 emit the single-pulse laser beam (Step S56).

Next, the controller 180 judges whether the APC timing period ended, by checking for an APC timing pulse (Step S57). If the APC timing period has not ended yet, the controller 180 performs the process of Step S55. If the APC timing period has ended, the controller 180 performs the process of Step S52.

Incidentally, operations of the sampling processor 140 and operations of relevant parts will be described in detail later.

In this way, when writing data on an optical disc, this embodiment controls the light intensity of the laser beam emitted from the semiconductor laser output controller 110 and controls the pulse form of the laser beam by switching it.

Next, operations of the sampling processor 140 according to this embodiment and operations of relevant parts will be described with reference to FIG. 15.

When the optical pickup apparatus 100 starts operation (Step S61), the photodetector 120 detects the laser beam outputted from the semiconductor laser output controller 110 and outputs the intensity level of the detected laser beam to the sampling processor 140 via the first converter 130 (Step S62).

Next, based on instructions from the central control processor (not shown), the controller 180 judges whether or not the optical pickup apparatus 100 is in write mode (Step S63).

If it is judged that the optical pickup apparatus 100 is in write mode, the controller 180 notifies the sampling processor 140 to that effect. Then, the sampling processor 140 performs the sampling process described below.

When the optical pickup apparatus 100 enters write mode, the controller 180 outputs generated APC timing pulses and sampling pulses to the sample-and-hold controller 145 with their timings.

First, the sample-and-hold controller 145 judges whether or not the APC timing pulse is entered within a fixed period (Step S64). If no APC timing pulse is detected within the fixed period, the sample-and-hold controller 145 makes the sample-and-hold circuit 141 outputs the sample value it holds to the subtractor 143 (Step S65) and performs the process of Step S68.

Incidentally, according to this embodiment, the sample value held by the sample-and-hold circuit 141 defaults to "0."

On the other hand, if the APC timing pulse is detected within the fixed period, the sample-and-hold controller 145 further judges whether or not the sampling pulses are entered within a fixed period (Step S66). However, if no timing pulse is detected within the fixed period, the sample-and-hold controller 145 makes the sample-and-hold circuit 141 outputs the sample value it holds to the subtractor 143 (Step S65), and then the controller 180 performs the process of Step S68.

If sampling pulses are detected within the fixed period, the sample-and-hold controller 145 makes the sample-and-hold circuit 141 acquire, as a sample value, the voltage level of inputted detection voltage based on the sample pulses outputted from the controller 180 and makes it output the acquired sample value to the subtractor 143 (Step S67).

Incidentally, the sample-and-hold circuit 141 holds the acquired sample value until instructed by the sample-and-hold controller 145 to acquire a new sample value.

Next, the sample-and-hold controller 145 makes the sampling voltage storage 142 output the target sample value it stores to the subtractor 143 (Step S68).

Upon receiving the sample value and the target sample value, the subtractor 143 subtracts the inputted sample value from the inputted target sample value and outputs the resulting voltage value to the integrator 144 (Step S69).

Upon receiving the voltage value obtained by the subtraction, the integrator 144 integrates the inputted voltage value, generates control voltage, and outputs the generated control voltage to the adding unit 160 (Step S70). Then, the sample-and-hold controller 145 performs the process of Step S63.

According to this embodiment, when the sampling process is performed in this way, since the adding unit 170 adds the control current and pulse currents, the semiconductor laser output controller 110 can perform negative feedback control of the light intensity of the laser beam.

As described above, according to this embodiment, the optical pickup apparatus 100 comprises: the semiconductor laser output controller 110 for emitting laser beam to the optical disc by switching between the multi-pulse laser beam and the single-pulse laser beam, and for emitting the single-pulses when recording specific modulated data on the optical disc during a predetermined APC timing period; the photodetector 120 for detecting the emitted laser beam; the sampling voltage storage 142 which stores the target voltages; the sampling processor 140 for acquiring the light intensity level of the detected laser beam as a sampling value when recording the specific modulated data during the APC timing period and calculates error between stored target voltages and the acquired sample value; and the controller 180 for controlling the output intensity level of the laser beam emitted from the semiconductor laser output controller 110, based on the calculated error.

According to this embodiment with the above configuration, as is the case with the first embodiment, when recording the write data on an optical disc by modulating the intensity level of the laser beam outputted from a semiconductor laser, since the optical pickup apparatus 100 can use the multi-pulse laser beam and acquire the sample values using the laser beam with a stable waveform, it can control the semiconductor laser output controller 110 which emits the laser beam, based on the sample values which allow the light intensity level of the laser beam to be grasped exactly, and can change intensity levels or irradiation times of the laser beam easily and independently.

Also, according to this embodiment, the optical pickup apparatus 100 performs the emission of the single-pulse laser beam to the optical disc based on specific modulated data. Therefore, the single-pulse laser beam with high heat buildup is not emitted to a fixed site on the optical disc, and changing the site irradiated with the laser beam each time data is recorded. Furthermore, when the single-pulse laser beam is emitted, the single-pulse laser beam is emitted to different site each time data is recorded. Thus, the durability of a recording film on the optical disc can be improved.

According to this embodiment, as is the case with the second embodiment, the erase pulses are emitted as single-pulses when recording 5T-long modulated data constituting the erase pulses (an erase interval). However, the run length cited here is not restrictive, and modulated data with a shorter or longer run length may also be used.

Incidentally, when using modulated data of a relatively long run length such as 10T or 11T, single-pulses may be emitted for different kinds of modulated data with a different run length. This will increase the frequency of sampling.

According to this embodiment, the optical pickup apparatus 100 controls the emission of laser beam when recording write data on an optical disc. However, if the optical pickup apparatus 100 which comprises the photodetector 120 and semiconductor laser circuit is further equipped with computer and a recording medium, a negative feedback control program may be stored on the recording medium and read by the computer to perform negative feedback control in the manner described above.

Fourth Embodiment

A fourth embodiment of the optical pickup apparatus will be described with reference to FIGS. 16 to 17.

The optical pickup apparatus according to this embodiment is characterized in that the sampling pulses are generated for negative feedback control based solely on the first modulated data inputted during an APC timing period in contrast to use the APC timing pulses and sampling pulses for negative feedback control like the first embodiment in other periods. In other respects, the optical pickup apparatus 100 according to this embodiment is the same as the first embodiment. Thus, components will be denoted by the same reference numerals as the corresponding components of the first embodiment and description thereof will be omitted.

Figure 16:
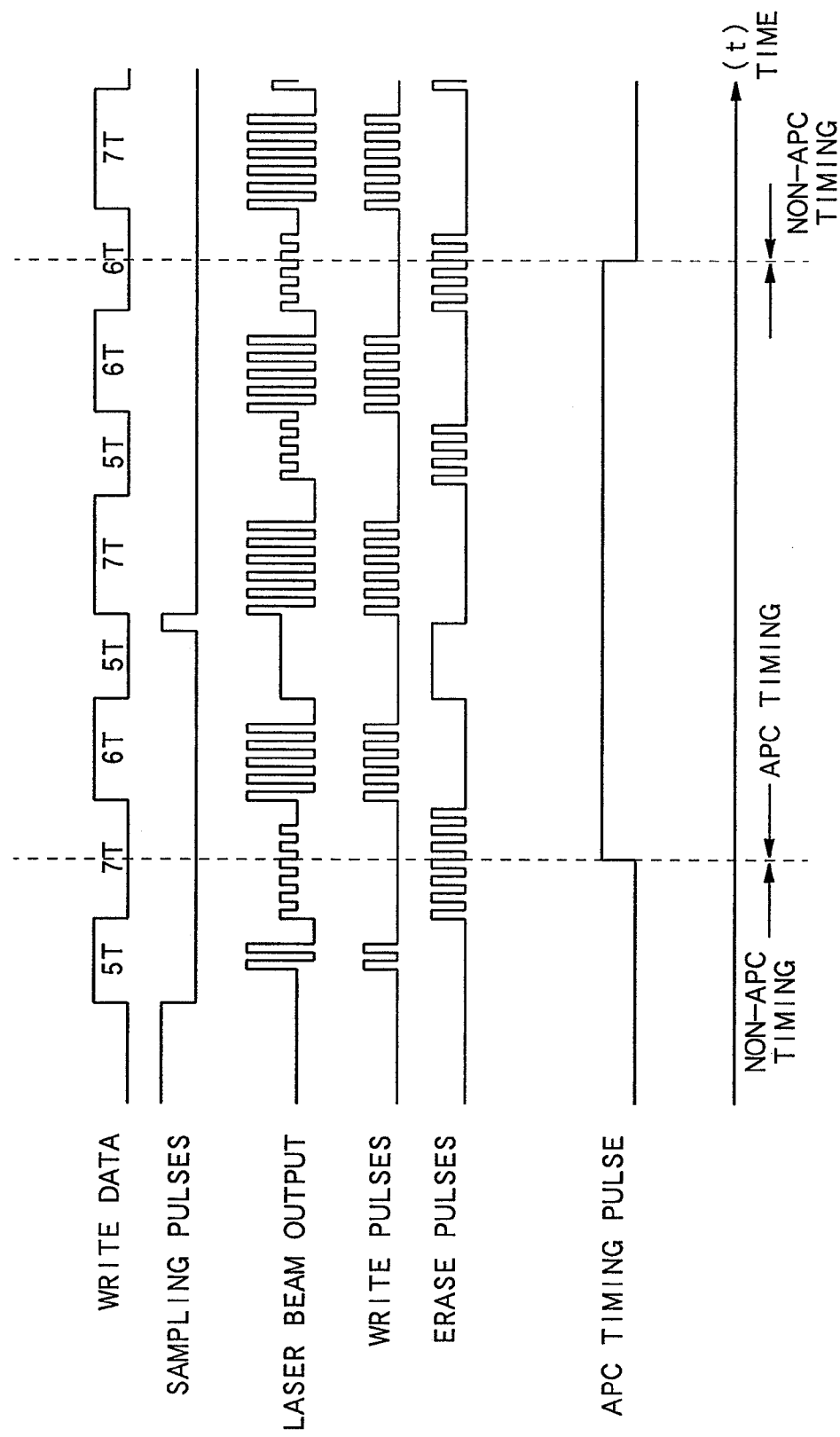
FIG. 16 is a timing chart illustrating a negative feedback control operation according to a fourth embodiment.
Figure 17:
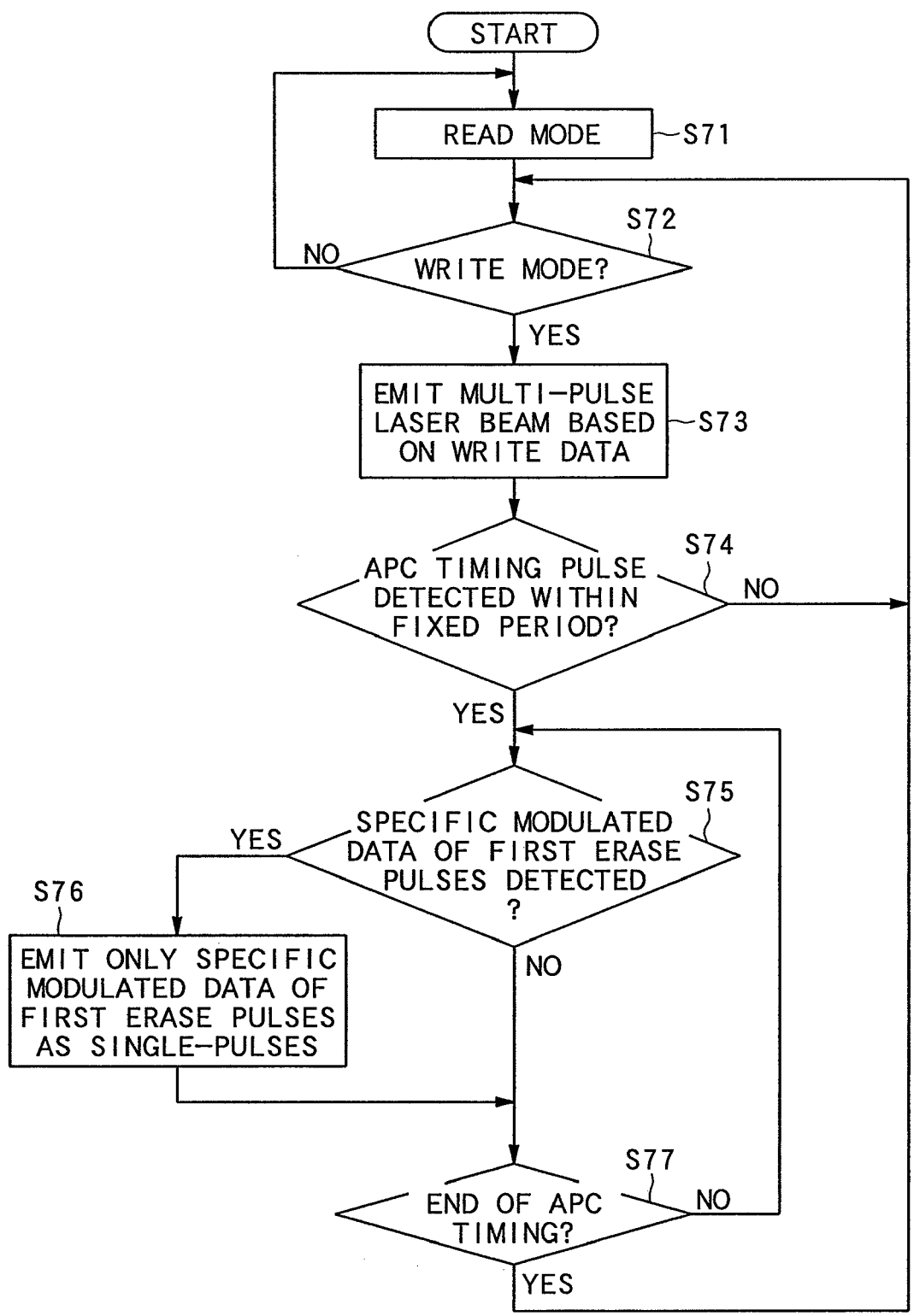
FIG. 17 is a flowchart showing a negative feedback operation (output switching control) according to the fourth embodiment.

FIG. 16 is a diagram illustrating a negative feedback operation during a data write operation according to this embodiment while FIG. 17 is a flowchart showing an output switching control operation for the laser beam according to this embodiment.

According to this embodiment, in write mode in which data is written on the optical disc, the sampling processor 140 and the pulse current generator 160 are controlled during an APC timing period based on the first modulated data inputted out of modulated data constituting inputted write data.

Specifically, as is the case with the first embodiment, the controller 180 receives write data, generates the sampling pulses based solely on the first specific modulated data inputted during an APC timing period, and controls the sampling processor 140 and the pulse current generator 160 based on the sampling pulses.

Incidentally, according to this embodiment, the 5T-long modulated data is used as the specific modulated data.

Next, negative feedback control according to this embodiment will be described with reference to FIGS. 16 and 17.

As shown in FIG. 16, when the controller 180 according to this embodiment receives the first 5T-long modulated data inputted during the APC timing period and if the 5T-long modulated data causes erase pulses to be generated, the controller 180 generates the sampling pulses and outputs them to the sampling processor 140 and the pulse current generator 160. Then, the sampling processor 140 performs a sampling process based on the inputted sampling pulses and the pulse current generator 160 generates single-pulse erase pulses based on the sampling pulses.

According to this embodiment again, as is the case with the first embodiment, the negative feedback control operation is performed by the controller 180 through the output switching control operation of switching the pulse form of the laser beam and a sampling operation performed concurrently with the output switching control operation.

Incidentally, operations of the sampling process according to this embodiment are similar to those of the third embodiment and thus, description thereof will be omitted.

The output switching control operation according to this embodiment will be described below with reference to FIG. 17.

To begin with, by controlling the pulse current generator 160 and the semiconductor laser output controller 110, the controller 180 makes the semiconductor laser output controller 110 emit the single-pulse laser beam at the read level (Step S71 (read mode)).

Next, the controller 180 judges whether or not the optical pickup apparatus 100 is in write mode, based on instructions from a central control processor (not shown) which controls the entire optical pickup apparatus 100 (Step S72).

If it is judged that the optical pickup apparatus 100 will remain in read mode or that the optical pickup apparatus 100 will switch from write mode to read mode, the controller 180 performs the process of Step S71.

Here, the controller 180 makes the semiconductor laser output controller 110 emit the laser beam at the read level, by controlling the pulse current generator 160 and the semiconductor laser output controller 110.

On the other hand, if it is judged, based on instructions from the central control processor (not shown), that the optical pickup apparatus 100 has switched from read mode to write mode or will remain in write mode, the controller 180 performs the following operations.

First, by controlling the semiconductor laser output controller 110 and the pulse current generator 160, the controller 180 makes the semiconductor laser output controller 110 emit the multi-pulse laser beam based on modulated data (Step S73).

In the process of Step S73, during a non-APC timing period, or even during an APC timing period if no sampling pulse is generated, the sampling processor 140 generates and outputs control voltage by performing subtraction and integration of sample values being held. Thus, the semiconductor laser output controller 110 adds the control voltage to the currents generated by the pulse current generator 160 and the light intensity level of the laser beam is controlled based on the results of the addition.

Next, the controller 180 judges whether or not an APC timing pulse is detected within a fixed period (Step S74). If no APC timing pulse is detected, the controller 180 performs the process of Step S72.

On the other hand, if an APC timing pulse is detected within the fixed period, the controller 180 judges whether or not the modulated data entered is the 5T-long specific modulated data of the first erase pulses (Step S75). If the modulated data is not the 5T-long specific modulated data, if the modulated data constitutes write pulses even if it is 5T-long specific modulated data, or if the modulated data does not constitute the first erase pulses, the controller 180 performs the process of Step S77.

If the 5T-long specific modulated data of the first erase pulses is detected, the controller 180 outputs sampling pulses to the sampling processor 140 and the pulse current generator 160, converts the modulated data into the single-pulses, and makes the semiconductor laser output controller 110 emit the single-pulse laser beam (Step S76).

Next, the controller 180 judges whether the APC timing period ended, by checking for an APC timing pulse (Step S77). If the APC timing period has not ended yet, the controller 180 performs the process of Step S75. If the APC timing period has ended, the controller 180 performs the process of Step S72.

In this way, when writing data on an optical disc, this embodiment controls the light intensity of the laser beam emitted from the semiconductor laser output controller 110 and controls the pulse form of the laser beam by switching it.

As described above, according to this embodiment, the optical pickup apparatus 100 comprises: the semiconductor laser output controller 110 for emitting the laser beam to the optical disc by switching between the multi-pulse laser beam and the single-pulse laser beam, and for emitting the single-pulses when recording the first specific modulated data on the optical disc during a predetermined APC timing period; the photodetector 120 for detecting the emitted laser beam; the sampling voltage storage 142 which stores target voltages; the sampling processor 140 for acquiring the light intensity level of the detected laser beam as a sampling value when recording the first specific modulated data during the APC timing period and calculates error between the stored target voltages and the acquired sample value; and the controller 180 for controlling the output intensity level of the laser beam emitted from the semiconductor laser output controller 110, based on the calculated error.

According to this embodiment with the above configuration, as is the case with the first embodiment, when recording the write data on an optical disc by modulating the intensity level of the laser beam outputted from a semiconductor laser, since the optical pickup apparatus 100 can use the multi-pulse laser beam and acquire the sample values using the laser beam with a stable waveform, it can control the semiconductor laser output controller 110 which emits the laser beam, based on the sample values which allow the light intensity level of the laser beam to be grasped exactly, and can change intensity levels or irradiation times of the laser beam easily and independently.

Also, according to this embodiment, the optical pickup apparatus 100 directs the single-pulse laser beam to the optical disc based on the first specific modulated data inputted during the APC timing period. Therefore, the single-pulse laser beam with high heat buildup is not emitted to a fixed site on the optical disc, and changing the site irradiated with the laser beam each time data is recorded. Furthermore, when the single-pulse laser beam is emitted, the single-pulse laser beam is emitted to different site each time data is recorded. Thus, the durability of a recording film on the optical disc can be improved.

According to this embodiment, the erase pulses are emitted as single-pulses when recording 5T-long modulated data constituting the erase pulses (an erase interval). However, the run length cited here is not restrictive, and modulated data with a shorter or longer run length may also be used.

Incidentally, according to this embodiment, sampling pulses for negative feedback control are generated based solely on the first specific modulated data inputted during an APC timing period. However, this is not restrictive. Alternatively, the second or later specific modulated data item, or multiple specific modulated data items, for example, odd-numbered specific modulated data items may be used to generate the sampling pulses for negative feedback control.

Furthermore, according to this embodiment, the erase pulses are emitted as single-pulses when recording 5T-long modulated data constituting the erase pulses (an erase interval). However, the run length cited here is not restrictive, and modulated data with a shorter or longer run length may also be used.

Incidentally, when using modulated data of a relatively long run length such as 10T or 11T, single-pulses may be emitted for different kinds of modulated data with a different run length. This will increase the frequency of sampling.

According to this embodiment, the optical pickup apparatus 100 controls the emission of laser beam when recording write data on an optical disc. However, if the optical pickup apparatus 100 which comprises the photodetector 120 and semiconductor laser circuit is further equipped with computer and a recording medium, a negative feedback control program may be stored on the recording medium and read by the computer to perform negative feedback control in the manner described above.

The entire disclosure of Japanese Patent Application No. 2003-4828 filed on Jan. 10, 2003 including the specification, claims, drawings and summary is incorporated herein by reference in its entirety.

What is claimed is:

1. An optical pickup apparatus which modulates intensity of a light beam based on data to be recorded on an optical recording medium and emits the light beam, of which intensity is modified, to the optical recording medium, the optical pickup apparatus comprising:
   an emission device which emits the light beam to the optical recording medium by switching between a multi-pulse beam consisting of a plurality of pulsed lights and single-pulse beam consisting of a single pulsed light depending on the data, and depending on whether a recording period is a predetermined period, wherein the emission device emits a write beam of the multi-pulse beam at the time of forming a mark of the data, and emits an erase beam at the time of forming a space of the data, and wherein the emission device emits the erase beam of the single-pulse beam during the predetermined period, and emits the erase beam of the multi-pulse beam during a period other than the predetermined period;
   a detection device which detects at least part of the light beam emitted from said emission device;
   an acquisition device which acquires an emitted light intensity level of the detected light beam as a sampling value during the predetermined period;
   a storage device which stores a target sampling value that serves as a target for the light intensity level of the light beam;
   an error calculation device which calculates error between the stored target sampling value and the acquired sampling value; and
   a control device which controls the output intensity level of the light beam emitted from said emission device, based on the calculated sampling error,
   wherein an automatic power control timing period is regarded as the predetermined period.

2. The optical pickup apparatus according to claim 1, further comprising a period setting device which sets the predetermined period for said acquisition device to acquire the emitted light intensity level of the detected light beam.

3. An optical pickup apparatus according to claim 1, wherein a level of the write beam of the multi-pulse beam is different from a level of the erase beam of the multi-pulse beam.

4. An optical pickup apparatus which records data on an optical recording medium with multiple kinds of different partial data by modulating a intensity of light beam based on each kind of partial data and emitting the light beam, of which intensity is modified, to the optical recording medium, the optical pickup apparatus comprising:
   an emission device which emits the light beam to the optical recording medium by switching between a multi-pulse beam for recording one item of the partial data using a plurality of pulsed lights and a single-pulse beam for recording one item of the partial data using one pulsed light, said emission device emitting the single-pulse beam when recording a predetermined first kind of partial data during a predetermined period on the optical recording medium, wherein the emission device emits a write beam of the multi-pulse beam at the time of forming a mark of a predetermined second kind of the partial data, and emits an erase beam at the time of forming a space of the predetermined first kind of the partial data, and wherein the emission device emits the erase beam of the single-pulse beam during the predetermined period, and emits the erase beam of the multi-pulse beam during a period other than the predetermined period;
   a detection device which detects at least part of the light beam emitted from the emission device;
   an acquisition device which acquires an emitted light intensity level of the detected light beam as a sampling value when recording the space of the predetermined first kind of the partial data during the predetermined period;
   a storage device which stores a target sampling value that serves as a target for the light intensity level of the light beam;
   an error calculation device which calculates error between the stored target sampling value and the acquired sampling value; and
   a control device which controls the output intensity level of the light beam emitted from the emission device, based on the calculated sampling error wherein an automatic power control timing period is regarded as the predetermined period.

5. The optical pickup apparatus according to claim 4, wherein said emission device emits the single-pulse beam only when the acquisition device acquires the sampling value.

6. A light beam emission control method which modulates intensity of a light beam based on data to be recorded on an optical recording medium and emits the light beam, of which intensity is modified, to the optical recording medium, the light beam emission control method comprising:

an emission process of emitting the light beam from an emission device to the optical recording medium by switching between a multi-pulse beam consisting of a plurality of pulsed lights and single-pulse beam consisting of a single pulsed light depending on the data, and depending on whether a recording period is a predetermined period, wherein the emission device emits a write beam of the multi-pulse beam at the time of forming a mark of the data, and emits an erase beam at the time of forming a space of the data, and wherein the emission device emits the erase beam of the single-pulse beam during the predetermined period, and emits the erase beam of the multi-pulse beam during a period other than the predetermined period;

a detection process of detecting at least part of the light beam emitted from said emission device;

an acquisition process of acquiring an emitted light intensity level of the detected light beam as a sampling value during the predetermined period;

an error calculation process of calculating error between the acquired sampling value and a target sampling value, wherein the target sampling value that serves as a target for the light intensity level of the light beam and is prestored in a storage device; and an emission control process of controlling the emission of the light beam from said emission device, based on the calculated sampling error in said error calculation process, wherein an automatic power control timing period is regarded as the predetermined period.

7. A light beam emission control method which records data on an optical recording medium with multiple kinds of different partial data by modulating a intensity of light beam based on each kind of partial data and emitting the light beam, of which intensity is modified, from an emission device to the optical recording medium, the light beam emission control method comprising:

an emission process of emitting the light beam from said emission device to the optical recording medium by switching between a multi-pulse beam for recording one item of the partial data using a plurality of pulsed lights and a single-pulse beam for recording one item of the partial data using one pulsed light, said emission process emitting the single-pulse beam from said emission device when recording a predetermined first kind of partial data during a predetermined period on the optical recording medium, wherein the emission device emits a write beam of the multi-pulse beam at the time of forming a mark of a predetermined second kind of the partial data, and emits an erase beam at the time of forming a space of the predetermined first kind of the partial data, and wherein the emission device emits the erase beam of the single-pulse beam during the predetermined period, and emits the erase beam of the multi-pulse beam during a period other than the predetermined period;

a detection process of detecting at least part of the light beam emitted from said emission device;

an acquisition process of acquiring an emitted light intensity level of the detected light beam as a sampling value when recording the space of the predetermined first kind of the partial data during the predetermined period;

an error calculation process of calculating error between the acquired sampling value and a target sampling value, wherein the target sampling value that serves as a target for the light intensity level of the light beam and is prestored in a storage device; and an emission control process of controlling the emission of the light beam from said emission device, based on the calculated sampling error in said error calculation process wherein an automatic power control timing period is regarded as the predetermined period.

8. A recording medium wherein a light beam emission control program is recorded so as to be read by a computer, the computer included in a optical pickup apparatus which records data on an optical recording medium with multiple kinds of different partial data by modulating a intensity of light beam based on each kind of partial data and emitting the light beam, of which intensity is modified, from an emission device to the optical recording medium, said program causing the computer to function as:

an emission control device which controls the emission of the light beam from the emission device to the optical recording medium by switching between a multi-pulse beam consisting of a plurality of pulsed lights and single-pulse beam consisting of a single pulsed light depending on the data, and depending on whether a recording period is a predetermined period wherein the emission device emits a write beam of the multi-pulse beam at the time of forming a mark of the data, and emits an erase beam at the time of forming a space of the data, and wherein the emission device emits the erase beam of the single-pulse beam during the predetermined period, and emits the erase beam of the multi-pulse beam during a period other than the predetermined period;

a detection device which detects at least part of the light beam emitted from said emission device;

an acquisition device which acquires an emitted light intensity level of the detected light beam as a sampling value during the predetermined period;

an error calculation process of calculating error between the acquired sampling value and a target sampling value, wherein the target sampling value that serves as a target for the light intensity level of the light beam and is prestored in a storage device; and a level control device which controls the output intensity level of the light beam emitted from said emission device, based on the calculated sampling error, wherein an automatic power control timing period is regarded as the predetermined period.

9. A recording medium wherein a light beam emission control program is recorded so as to be read by a computer, the computer included in a optical pickup apparatus which records data on an optical recording medium with multiple kinds of different partial data by modulating a intensity of light beam based on each kind of partial data and emitting the light beam, of which intensity is modified, from an emission device to the optical recording medium, said program causing the computer to function as:

an emission control device which controls the emission of the light beam from the emission device to the optical recording medium by switching between a multi-pulse beam for recording one item of the partial data using a plurality of pulsed lights and a single-pulse beam for recording one item of the partial data using one pulsed light, said emission control device controlling the emission of the single-pulse beam when recording a predetermined first kind of partial data during a predetermined period on the optical recording medium, wherein the emission device emits a write beam of the multi-pulse beam at the time of forming a mark of a predetermined second kind of the partial data, and emits an erase beam at the time of forming a space of the predetermined first kind of the partial data, and wherein the emission device emits the erase beam of the single-pulse beam during the predetermined period, and emits the erase beam of the multi-pulse beam during a period other than the predetermined period;

a detection device which detects at least part of the light beam emitted from said emission device;

an acquisition device which acquires an emitted light intensity level of the detected light beam as a sampling value when recording the space of predetermined first kind of the partial data during the predetermined period;

an error calculation process of calculating error between the acquired sampling value and a target sampling value, wherein the target sampling value that serves as a target for the light intensity level of the light beam and is prestored in a storage device; and a level control device which controls the output intensity level of the light beam emitted from said emission device, based on the calculated sampling error wherein an automatic power control timing period is regarded as the predetermined period.

* * * * *